(12) United States Patent
Wells

(10) Patent No.: US 7,951,001 B2
(45) Date of Patent: May 31, 2011

(54) GAMING DEVICE HAVING A THREE DIMENSIONAL DISPLAY DEVICE

(75) Inventor: William Wells, Reno, NV (US)

(73) Assignee: IGT, Reno, NV (US)

( * ) Notice: Subject to any disclaimer, the term of this patent is extended or adjusted under 35 U.S.C. 154(b) by 403 days.

(21) Appl. No.: 11/167,655

(22) Filed: Jun. 27, 2005

(65) Prior Publication Data

US 2005/0255908 A1 Nov. 17, 2005

Related U.S. Application Data

(63) Continuation of application No. 10/213,626, filed on Aug. 6, 2002, now Pat. No. 7,841,944.

(51) Int. Cl.
| | |
|---|---|
| A63F 13/00 | (2006.01) |
| A63F 9/24 | (2006.01) |
| G02F 1/13 | (2006.01) |
| G02F 1/1347 | (2006.01) |
| A63F 9/00 | (2006.01) |
| G02B 27/22 | (2006.01) |

(52) U.S. Cl. ............... 463/33; 463/32; 463/31; 463/16; 463/20; 349/73

(58) Field of Classification Search .................... 463/16, 463/20, 33, 31, 32; 349/73
See application file for complete search history.

(56) References Cited

U.S. PATENT DOCUMENTS

| | | |
|---|---|---|
| 3,708,219 A | 1/1973 | Forlini et al. |
| 4,333,715 A | 6/1982 | Brooks |
| 4,517,558 A | 5/1985 | Davids |
| 4,574,391 A | 3/1986 | Morishima |
| 4,607,844 A | 8/1986 | Fullerton |
| 4,621,814 A | 11/1986 | Stepan et al. |
| 4,659,182 A | 4/1987 | Aizawa |
| 4,718,672 A | 1/1988 | Okada |
| 4,911,449 A | 3/1990 | Dickinson et al. |
| 4,912,548 A | 3/1990 | Shanker et al. |
| 5,086,354 A * | 2/1992 | Bass et al. ................ 359/465 |
| 5,113,272 A | 5/1992 | Reamey |
| 5,132,839 A | 7/1992 | Travis |
| 5,152,529 A | 10/1992 | Okada |
| 5,319,491 A | 6/1994 | Selbrede |
| 5,342,047 A | 8/1994 | Heidel et al. |
| 5,364,100 A | 11/1994 | Ludlow et al. |
| 5,375,830 A | 12/1994 | Takemoto et al. |
| 5,376,587 A | 12/1994 | Buchmann et al. |
| 5,393,057 A | 2/1995 | Marnell |

(Continued)

FOREIGN PATENT DOCUMENTS

AU 721968 7/2000

(Continued)

OTHER PUBLICATIONS

Living in a flat world? Advertisement written by Deep Video Imaging Ltd., published 2000.

(Continued)

*Primary Examiner* — Melba Bumgamer
*Assistant Examiner* — Frank M Leiva
(74) *Attorney, Agent, or Firm* — Weaver Austin Villeneuve & Sampson LLP

(57) ABSTRACT

A wagering gaming device having a three-dimensional display device which includes a plurality display screens. The display screens display three dimensional images having an height, actual width and depth.

49 Claims, 14 Drawing Sheets

U.S. PATENT DOCUMENTS

| | | | |
|---|---|---|---|
| 5,393,061 A | 2/1995 | Manship et al. | |
| 5,395,111 A | 3/1995 | Inoue | |
| 5,467,893 A | 11/1995 | Landis, II et al. | |
| 5,539,547 A | 7/1996 | Ishii et al. | |
| 5,580,055 A | 12/1996 | Hagiwara | |
| 5,585,821 A | 12/1996 | Ishikura et al. | |
| 5,589,980 A | 12/1996 | Bass et al. | |
| 5,647,798 A | 7/1997 | Faiciglia | |
| 5,725,428 A | 3/1998 | Achmueller | |
| 5,745,197 A * | 4/1998 | Leung et al. | 349/77 |
| 5,752,881 A | 5/1998 | Inoue | |
| 5,762,552 A | 6/1998 | Vuong et al. | |
| 5,764,317 A | 6/1998 | Sadovnik et al. | |
| 5,785,315 A | 7/1998 | Eiteneer et al. | |
| 5,833,537 A | 11/1998 | Barrie | |
| 5,851,148 A | 12/1998 | Brune et al. | |
| 5,910,046 A | 6/1999 | Wada et al. | |
| 5,923,307 A | 7/1999 | Hogle, IV | |
| 5,951,397 A | 9/1999 | Dickinson | |
| 5,956,180 A | 9/1999 | Bass et al. | |
| 5,967,893 A | 10/1999 | Lawrence et al. | |
| 5,988,638 A | 11/1999 | Rodesch et al. | |
| 5,993,027 A | 11/1999 | Yamamoto | |
| 6,001,016 A | 12/1999 | Walker et al. | |
| 6,015,346 A | 1/2000 | Bennett | |
| 6,027,115 A | 2/2000 | Griswold et al. | |
| 6,050,895 A | 4/2000 | Luciano, Jr. et al. | |
| 6,054,969 A * | 4/2000 | Haisma | 345/7 |
| 6,057,814 A | 5/2000 | Kalt | |
| 6,059,289 A | 5/2000 | Vancura | |
| 6,059,658 A | 5/2000 | Mangano et al. | |
| 6,068,552 A | 5/2000 | Walker et al. | |
| 6,072,545 A | 6/2000 | Gribshaw et al. | |
| 6,086,066 A | 7/2000 | Takeuchi | |
| 6,093,102 A | 7/2000 | Bennett | |
| 6,104,405 A | 8/2000 | Idaszak et al. | |
| 6,135,884 A | 10/2000 | Hedrick et al. | |
| 6,159,095 A | 12/2000 | Frohm et al. | |
| 6,159,098 A | 12/2000 | Slomiany et al. | |
| 6,168,520 B1 | 1/2001 | Baerlocher et al. | |
| 6,190,255 B1 | 2/2001 | Thomas et al. | |
| 6,213,875 B1 | 4/2001 | Suzuki | |
| 6,227,971 B1 | 5/2001 | Weiss | |
| 6,234,897 B1 | 5/2001 | Frohm et al. | |
| 6,244,596 B1 | 6/2001 | Kondratjuk | |
| 6,251,013 B1 | 6/2001 | Bennett | |
| 6,251,014 B1 | 6/2001 | Stockdale et al. | |
| 6,252,707 B1 | 6/2001 | Kleinberger et al. | |
| 6,254,481 B1 | 7/2001 | Jaffe | |
| 6,261,178 B1 | 7/2001 | Bennett | |
| 6,270,411 B1 | 8/2001 | Gura et al. | |
| 6,297,785 B1 | 10/2001 | Heintz et al. | |
| 6,315,666 B1 | 11/2001 | Mastera et al. | |
| 6,322,445 B1 | 11/2001 | Miller | |
| 6,337,513 B1 | 1/2002 | Clevenger et al. | |
| 6,347,996 B1 | 2/2002 | Gilmore et al. | |
| 6,368,216 B1 | 4/2002 | Hedrick et al. | |
| 6,379,244 B1 | 4/2002 | Sagawa et al. | |
| 6,398,220 B1 | 6/2002 | Inoue | |
| 6,416,827 B1 | 7/2002 | Chakrapani et al. | |
| 6,444,496 B1 | 9/2002 | Edwards et al. | |
| 6,445,185 B1 | 9/2002 | Damadian et al. | |
| 6,491,583 B1 | 12/2002 | Gauselmann | |
| 6,503,147 B1 | 1/2003 | Stockdale et al. | |
| 6,511,375 B1 | 1/2003 | Kaminkow | |
| 6,512,559 B1 | 1/2003 | Hashimoto et al. | |
| 6,514,141 B1 | 2/2003 | Kaminkow et al. | |
| 6,517,433 B2 * | 2/2003 | Loose et al. | 463/20 |
| 6,517,437 B1 | 2/2003 | Wells et al. | |
| 6,520,856 B1 | 2/2003 | Walker et al. | |
| 6,547,664 B2 | 4/2003 | Saunders | |
| 6,575,541 B1 | 6/2003 | Hedrick et al. | |
| 6,585,591 B1 | 7/2003 | Baerlocher et al. | |
| 6,612,927 B1 * | 9/2003 | Slomiany et al. | 463/16 |
| D480,961 S | 10/2003 | Deadman | |
| 6,644,664 B2 | 11/2003 | Muir et al. | |
| 6,646,695 B1 | 11/2003 | Gauselmann | |
| 6,652,378 B2 | 11/2003 | Cannon et al. | |
| 6,659,864 B2 | 12/2003 | McGahn et al. | |
| 6,661,425 B1 | 12/2003 | Hiroaki | |
| 6,695,696 B1 | 2/2004 | Kaminkow | |
| 6,695,703 B1 | 2/2004 | McGahn | |
| 6,702,675 B2 | 3/2004 | Poole et al. | |
| 6,712,694 B1 | 3/2004 | Nordman | |
| 6,715,756 B2 | 4/2004 | Inoue | |
| 6,717,728 B2 | 4/2004 | Putilin | |
| 6,722,979 B2 | 4/2004 | Gilmore et al. | |
| 6,802,777 B2 | 10/2004 | Seelig et al. | |
| 6,817,945 B2 | 11/2004 | Seelig et al. | |
| 6,817,946 B2 | 11/2004 | Motegi et al. | |
| 6,887,157 B2 | 5/2005 | LeMay et al. | |
| 6,890,259 B2 | 5/2005 | Breckner et al. | |
| 6,906,762 B1 * | 6/2005 | Witehira et al. | 349/73 |
| 6,908,381 B2 * | 6/2005 | Ellis | 463/13 |
| 6,937,298 B2 | 8/2005 | Okada | |
| 6,981,635 B1 | 1/2006 | Hughs-Baird et al. | |
| 7,040,987 B2 | 5/2006 | Walker et al. | |
| 7,056,215 B1 | 6/2006 | Olive | |
| 7,095,180 B2 | 8/2006 | Emslie et al. | |
| 7,097,560 B2 | 8/2006 | Okada | |
| 7,108,603 B2 | 9/2006 | Olive | |
| 7,115,033 B1 | 10/2006 | Timperley | |
| 7,128,647 B2 * | 10/2006 | Muir | 463/20 |
| 7,159,865 B2 | 1/2007 | Okada | |
| 7,160,187 B2 | 1/2007 | Loose et al. | |
| 7,166,029 B2 | 1/2007 | Enzminger | |
| 7,204,753 B2 | 4/2007 | Ozaki et al. | |
| 7,207,883 B2 | 4/2007 | Nozaki et al. | |
| 7,220,181 B2 | 5/2007 | Okada | |
| 7,252,288 B2 | 8/2007 | Seelig et al. | |
| 7,252,591 B2 | 8/2007 | Van Asdale | |
| 7,255,643 B2 | 8/2007 | Ozaki et al. | |
| 7,274,413 B1 | 9/2007 | Sullivan et al. | |
| 7,309,284 B2 | 12/2007 | Griswold et al. | |
| 7,322,884 B2 | 1/2008 | Emori et al. | |
| 7,324,094 B2 | 1/2008 | Moilanen et al. | |
| 7,329,181 B2 | 2/2008 | Hoshino et al. | |
| 7,352,424 B2 | 4/2008 | Searle | |
| 7,439,683 B2 | 10/2008 | Emslie | |
| 7,473,173 B2 | 1/2009 | Peterson et al. | |
| 7,505,049 B2 | 3/2009 | Engel | |
| 7,510,475 B2 | 3/2009 | Loose et al. | |
| 7,559,837 B1 | 7/2009 | Yoseloff et al. | |
| 7,619,585 B2 | 11/2009 | Bell et al. | |
| 7,624,339 B1 | 11/2009 | Engel et al. | |
| 7,626,594 B1 | 12/2009 | Witehira et al. | |
| 7,724,208 B1 | 5/2010 | Engel et al. | |
| 7,730,413 B1 | 6/2010 | Engel et al. | |
| 7,742,124 B2 | 6/2010 | Bell | |
| 7,742,239 B2 | 6/2010 | Bell | |
| 7,841,944 B2 | 11/2010 | Wells | |
| 2001/0013681 A1 | 8/2001 | Bruzzese et al. | |
| 2001/0015753 A1 | 8/2001 | Myers | |
| 2001/0016513 A1 | 8/2001 | Muir et al. | |
| 2001/0031658 A1 | 10/2001 | Ozaki | |
| 2002/0022518 A1 | 2/2002 | Okuda et al. | |
| 2002/0036825 A1 | 3/2002 | Lipton | |
| 2002/0045472 A1 | 4/2002 | Adams | |
| 2002/0086725 A1 | 7/2002 | Fasbender et al. | |
| 2002/0167637 A1 | 11/2002 | Burke | |
| 2002/0173354 A1 | 11/2002 | Winans et al. | |
| 2002/0175466 A1 | 11/2002 | Loose et al | |
| 2002/0183105 A1 | 12/2002 | Cannon | |
| 2002/0183109 A1 | 12/2002 | McGahn et al. | |
| 2003/0027624 A1 | 2/2003 | Gilmore et al. | |
| 2003/0032478 A1 | 2/2003 | Takahama et al. | |
| 2003/0032479 A1 | 2/2003 | LeMay et al. | |
| 2003/0060271 A1 | 3/2003 | Gilmore et al. | |
| 2003/0064781 A1 | 4/2003 | Muir | |
| 2003/0069063 A1 | 4/2003 | Bilyeu et al. | |
| 2003/0087690 A1 | 5/2003 | Loose | |
| 2003/0128427 A1 | 7/2003 | Kalmanash | |
| 2003/0130026 A1 | 7/2003 | Breckner et al. | |
| 2003/0130028 A1 | 7/2003 | Aida | |
| 2003/0148804 A1 | 8/2003 | Ikeya et al. | |
| 2003/0157980 A1 | 8/2003 | Loose et al. | |
| 2003/0176214 A1 | 9/2003 | Burak et al. | |

| | | |
|---|---|---|
| 2003/0199295 A1 | 10/2003 | Vancura |
| 2003/0220134 A1 | 11/2003 | Walker et al. |
| 2003/0234489 A1 | 12/2003 | Okada |
| 2003/0236114 A1 | 12/2003 | Griswold et al. |
| 2003/0236118 A1 | 12/2003 | Okada |
| 2004/0009803 A1 | 1/2004 | Bennett et al. |
| 2004/0023714 A1 | 2/2004 | Asdale |
| 2004/0029636 A1 | 2/2004 | Wells |
| 2004/0063490 A1 | 4/2004 | Okada |
| 2004/0066475 A1 | 4/2004 | Searle |
| 2004/0077401 A1 | 4/2004 | Schlottmann |
| 2004/0102244 A1* | 5/2004 | Kryuchkov et al. ............. 463/32 |
| 2004/0102245 A1 | 5/2004 | Escalera et al. |
| 2004/0116178 A1 | 6/2004 | Okada |
| 2004/0142748 A1 | 7/2004 | Loose et al. |
| 2004/0147303 A1 | 7/2004 | Imura et al. |
| 2004/0150162 A1 | 8/2004 | Okada |
| 2004/0162146 A1 | 8/2004 | Ooto |
| 2004/0166925 A1 | 8/2004 | Emori et al. |
| 2004/0166927 A1 | 8/2004 | Okada |
| 2004/0171423 A1 | 9/2004 | Silva |
| 2004/0183251 A1 | 9/2004 | Inoue |
| 2004/0183972 A1 | 9/2004 | Bell |
| 2004/0192430 A1 | 9/2004 | Blankstein et al. |
| 2004/0198485 A1 | 10/2004 | Loose |
| 2004/0207154 A1 | 10/2004 | Okada |
| 2004/0209666 A1 | 10/2004 | Tashiro |
| 2004/0209667 A1 | 10/2004 | Emori et al. |
| 2004/0209668 A1 | 10/2004 | Okada |
| 2004/0209671 A1 | 10/2004 | Okada |
| 2004/0209678 A1 | 10/2004 | Okada |
| 2004/0209683 A1 | 10/2004 | Okada |
| 2004/0214635 A1 | 10/2004 | Okada |
| 2004/0214637 A1 | 10/2004 | Nonaka |
| 2004/0219967 A1 | 11/2004 | Giobbi et al. |
| 2004/0224747 A1 | 11/2004 | Okada |
| 2004/0233663 A1 | 11/2004 | Emslie et al. |
| 2004/0239582 A1 | 12/2004 | Seymour |
| 2004/0266515 A1 | 12/2004 | Gauselmann |
| 2004/0266536 A1 | 12/2004 | Mattice et al. |
| 2005/0020348 A1 | 1/2005 | Thomas et al. |
| 2005/0026673 A1 | 2/2005 | Paulsen et al. |
| 2005/0032571 A1 | 2/2005 | Asonuma |
| 2005/0037843 A1 | 2/2005 | Wells et al. |
| 2005/0049032 A1 | 3/2005 | Kobayashi |
| 2005/0049046 A1 | 3/2005 | Kobayashi |
| 2005/0062410 A1 | 3/2005 | Bell et al. |
| 2005/0063055 A1 | 3/2005 | Engel |
| 2005/0079913 A1 | 4/2005 | Inamura |
| 2005/0085292 A1 | 4/2005 | Inamura |
| 2005/0153775 A1 | 7/2005 | Griswold et al. |
| 2005/0164786 A1 | 7/2005 | Connelly |
| 2005/0176493 A1 | 8/2005 | Nozaki et al. |
| 2005/0192090 A1 | 9/2005 | Muir et al. |
| 2005/0206582 A1 | 9/2005 | Bell et al. |
| 2005/0208994 A1 | 9/2005 | Berman |
| 2005/0233799 A1 | 10/2005 | LeMay et al. |
| 2005/0239539 A1 | 10/2005 | Inamura |
| 2005/0253775 A1 | 11/2005 | Stewart |
| 2005/0266912 A1 | 12/2005 | Sekiguchi |
| 2005/0285337 A1 | 12/2005 | Durham et al. |
| 2006/0025199 A1 | 2/2006 | Harkins et al. |
| 2006/0058100 A1 | 3/2006 | Pacey et al. |
| 2006/0063580 A1 | 3/2006 | Nguyen et al. |
| 2006/0073881 A1 | 4/2006 | Pryzby |
| 2006/0100014 A1 | 5/2006 | Griswold et al. |
| 2006/0103951 A1 | 5/2006 | Bell et al. |
| 2006/0111179 A1 | 5/2006 | Inamura |
| 2006/0125745 A1 | 6/2006 | Evanicky |
| 2006/0166727 A1 | 7/2006 | Burak |
| 2006/0191177 A1 | 8/2006 | Engel |
| 2006/0284574 A1 | 12/2006 | Emslie et al. |
| 2006/0290594 A1 | 12/2006 | Engel et al. |
| 2007/0004510 A1 | 1/2007 | Underdahl et al. |
| 2007/0004513 A1 | 1/2007 | Wells et al. |
| 2007/0010315 A1 | 1/2007 | Hein |
| 2007/0072665 A1 | 3/2007 | Muir |
| 2007/0077986 A1 | 4/2007 | Loose |
| 2007/0105610 A1 | 5/2007 | Anderson |
| 2007/0105611 A1 | 5/2007 | O'Halloran |
| 2007/0105628 A1 | 5/2007 | Arbogast et al. |
| 2007/0252804 A1 | 11/2007 | Engel et al. |
| 2008/0004104 A1 | 1/2008 | Durham et al. |
| 2008/0007486 A1 | 1/2008 | Fujinawa et al. |
| 2008/0020816 A1 | 1/2008 | Griswold et al. |
| 2008/0020839 A1 | 1/2008 | Wells et al. |
| 2008/0020840 A1 | 1/2008 | Wells et al. |
| 2008/0020841 A1 | 1/2008 | Wells et al. |
| 2008/0064497 A1 | 3/2008 | Griswold et al. |
| 2008/0096655 A1 | 4/2008 | Rasmussen et al. |
| 2008/0108422 A1 | 5/2008 | Hedrick et al. |
| 2008/0113745 A1 | 5/2008 | Williams et al. |
| 2008/0113746 A1 | 5/2008 | Williams et al. |
| 2008/0113747 A1 | 5/2008 | Williams et al. |
| 2008/0113748 A1 | 5/2008 | Williams et al. |
| 2008/0113749 A1 | 5/2008 | Williams et al. |
| 2008/0113756 A1 | 5/2008 | Williams et al. |
| 2008/0113775 A1 | 5/2008 | Williams et al. |
| 2008/0125219 A1 | 5/2008 | Williams et al. |
| 2008/0136741 A1 | 6/2008 | Williams et al. |
| 2008/0261674 A9 | 10/2008 | Okada |
| 2008/0284792 A1 | 11/2008 | Bell |
| 2009/0036208 A1 | 2/2009 | Wells et al. |
| 2009/0061983 A1 | 3/2009 | Kaufman et al. |
| 2009/0061984 A1 | 3/2009 | Yi et al. |
| 2009/0079667 A1 | 3/2009 | Schlottmann et al. |
| 2009/0082083 A1 | 3/2009 | Wilson et al. |
| 2009/0104989 A1 | 4/2009 | Williams et al. |
| 2009/0312095 A1 | 12/2009 | Durham et al. |
| 2010/0045601 A1 | 2/2010 | Engel et al. |
| 2010/0115391 A1 | 5/2010 | Engel et al. |
| 2010/0115439 A1 | 5/2010 | Engel |
| 2010/0190545 A1 | 7/2010 | Lauzon et al. |
| 2010/0234089 A1 | 9/2010 | Saffari et al. |

FOREIGN PATENT DOCUMENTS

| | | |
|---|---|---|
| AU | 2000PQ9586 | 8/2000 |
| CA | 2265283 | 9/1999 |
| EP | 0 454 423 | 10/1991 |
| EP | 0 484 103 | 5/1992 |
| EP | 0 860 807 | 8/1998 |
| EP | 0 919 965 | 6/1999 |
| EP | 0 997 857 | 10/1999 |
| EP | 1 000 642 A2 | 5/2000 |
| EP | 1 260 928 | 11/2002 |
| EP | 1 282 088 A2 | 2/2003 |
| EP | 1 391 847 | 2/2004 |
| EP | 1 462 152 | 9/2004 |
| EP | 1 492 063 | 12/2004 |
| EP | 1 826 739 | 8/2007 |
| GB | 1 464 896 | 2/1977 |
| GB | 2 120 506 | 11/1983 |
| GB | 2 253 300 | 9/1992 |
| GB | 2 316 214 | 2/1998 |
| GB | 2 385 004 A | 8/2003 |
| JP | H02-90884 | 7/1990 |
| JP | H03-20388 | 2/1991 |
| JP | 04-220276 | 8/1992 |
| JP | H05-68585 | 9/1993 |
| JP | 06-043425 | 2/1994 |
| JP | 07-124290 | 5/1995 |
| JP | H10-015247 | 1/1998 |
| JP | 10-234932 A | 9/1998 |
| JP | 11-000441 A | 1/1999 |
| JP | H11-137852 | 5/1999 |
| JP | 00-300729 | 10/2000 |
| JP | 00-350805 | 12/2000 |
| JP | 2000-354685 | 12/2000 |
| JP | 01-062032 | 3/2001 |
| JP | 01-238995 | 9/2001 |
| JP | 01-252393 | 9/2001 |
| JP | 01-252394 | 9/2001 |
| JP | 02-085624 | 3/2002 |
| JP | 2004-166879 | 11/2002 |
| JP | 2004-089707 | 3/2004 |
| JP | 2004-105616 | 4/2004 |
| JP | 2004166879 | 6/2004 |
| JP | 2005-253561 | 9/2005 |

| | | |
|---|---|---|
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-059607 | 3/2006 |
| JP | 2006-346226 | 12/2006 |
| JP | 2007-200869 | 8/2007 |
| RU | 2053559 C1 | 1/1996 |
| RU | 2 145 116 C1 | 1/2000 |
| RU | 29794 U1 | 5/2003 |
| WO | WO93-13446 | 7/1993 |
| WO | WO 99/42889 | 8/1999 |
| WO | WO9942889 | 8/1999 |
| WO | WO9944095 | 9/1999 |
| WO | WO99-53454 | 10/1999 |
| WO | WO 00/32286 | 6/2000 |
| WO | WO 01/15127 | 3/2001 |
| WO | WO 01/15132 | 3/2001 |
| WO | WO0115127 | 3/2001 |
| WO | WO0115128 | 3/2001 |
| WO | WO0115132 | 3/2001 |
| WO | WO 0115132 A1 * | 3/2001 |
| WO | WO01-38926 | 5/2001 |
| WO | WO0109664 | 8/2001 |
| WO | WO01-38926 | 5/2002 |
| WO | WO02-041046 | 10/2002 |
| WO | WO02-084637 | 10/2002 |
| WO | WO02-086610 | 10/2002 |
| WO | WO02-089102 | 11/2002 |
| WO | WO 03/001486 | 1/2003 |
| WO | WO03-023491 | 3/2003 |
| WO | WO03-032058 | 4/2003 |
| WO | WO03-039699 | 5/2003 |
| WO | WO03-040820 | 5/2003 |
| WO | PCT/NZ2003/00153 | 7/2003 |
| WO | WO03-079094 | 10/2003 |
| WO | WO2004-001486 | 12/2003 |
| WO | WO2004-001488 | 12/2003 |
| WO | WO2004-002143 | 12/2003 |
| WO | WO2004001486 | 12/2003 |
| WO | WO2004-008226 | 1/2004 |
| WO | WO2004-023825 | 3/2004 |
| WO | WO2004-025583 | 3/2004 |
| WO | WO2004-036286 | 4/2004 |
| WO | WO 2004/079674 A1 | 9/2004 |
| WO | WO2004102520 | 11/2004 |
| WO | WO 2005/071629 A1 | 8/2005 |
| WO | WO2006-034192 | 3/2006 |
| WO | WO2006038819 | 4/2006 |
| WO | WO2006-112740 | 10/2006 |
| WO | WO2007-040413 | 4/2007 |
| WO | WO2008-005278 | 1/2008 |
| WO | WO2008-028153 | 3/2008 |
| WO | WO2008-048857 | 4/2008 |
| WO | WO2008-061068 | 5/2008 |
| WO | WO2008-063908 | 5/2008 |
| WO | WO2008-063914 | 5/2008 |
| WO | WO2008-063952 | 5/2008 |
| WO | WO2008-063956 | 5/2008 |
| WO | WO2008-063968 | 5/2008 |
| WO | WO2008-063969 | 5/2008 |
| WO | WO2008-063971 | 5/2008 |
| WO | WO2008-079542 | 5/2008 |
| WO | WO2009-029720 | 3/2009 |
| WO | WO2009-039245 | 3/2009 |
| WO | WO2009-039295 | 3/2009 |
| WO | WO2009-054861 | 4/2009 |
| WO | WO2010-039411 | 9/2009 |
| WO | WO2010-023537 | 3/2010 |

OTHER PUBLICATIONS

Novel 3-D Video Display Technology Developed, News release Aug. 30, 1996, [online] Retrieved from the Internet: <URL http://www.eurekalert.org/summaries/1199.html> [Downloaded May 10, 2007].

Time Multiplexed Optical Shutter (TMOS): A Revolutionary Flat Screen Display Technology, [online] Retrieved from the Internet: <URL http://www.vea.com/TMOS.html>, Apr. 8, 1999 [Downloaded May 10, 2007].

Time Multiplexed Optical Shutter (TMOS): A Revolutionary Flat Screen Display Technology, [online] Retrieved from the Internet: <URL http://www.tralas.com/TMOS.html>, Apr. 5, 2001 [Downloaded May 10, 2007].

"Light Valve". [online] [retrieved on Nov. 15, 2005]. Retrieved from the Internet: <URL http://www.meko.co.uk/lightvalve.shtml> [Downloaded Nov. 15, 2005] (1 page).

"Liquid Crystal Display". [online]. [retrieved on Nov. 16, 2005]. ]. Retrieved from the Internet: <URL http://en.wikipedia.org/wiki/LCD> [Downloaded Jul. 5, 2007] (6 pages).

"What is SPD?" SPD Systems, Inc. 2002, [Online] Retrieved from the Internet: <URL http://www.spd-systems.com/spdq.htm> [Downloaded Dec. 4, 2002] (2 pages).

"Debut of the Let's Make A Deal Slot Machine," Let's Make A Deal 1999-2002, [Online] Retrieved from the Internet: <URL http:///www.letsmakeadeal.com/pr01.htm> [Downloaded Dec. 3, 2002] (2 pages).

"SPD," Malvino Inc., www.malvino.com, Jul. 19, 1999, 10 pages.

Bonsor, Kevin, "How Smart Windows Will Work," Howstuffworks, Inc. 1998-2002, http://www/howstuffworks.com/smart-window.htm/printable. Printed Nov. 25, 2002 (5 pages).

Bosner, "How Smart Windows Work," HowStuffWorks, Inc.,www.howstuffworks.com, 1998-2004, 9 pages.

International Exam Report dated Sep. 21, 2007 in European Application No. 05 705 315.9.

International Search Report, 5 page document, International Application No. PCT/US2005/000950, Dated Jun. 2, 2005.

Police 911 (Wikipedia) [online]. Wikipedia.org, 2001 [retrieved on Oct. 28, 2007]. Retrieved from the Internet: <URL:http://en.wikipedia.orgl/wiki/Police_911>.

Saxe et al., "Suspended-Particle Devices," www.refr-spd.com, Apr./May 1996, 5 pages.

U.S. Appl. No. 09/622,409, filed Nov. 6, 2000, Engel, Gabriel.

U.S. Appl. No. 10/048,966, filed Feb. 6, 2002, Engel, Gabriel.

U.S. Office Action Final dated Apr. 22, 1919 issued in U.S. Appl. No. 11/514,808 [P194].

U.S. Office Action dated Oct. 9, 2009 issued in U.S. Appl. No. 11/514,808 [P194].

U.S. Office Action dated Dec. 2, 2009 issued in U.S. Appl. No. 11/829,852 [P194C1].

U.S. Office Action dated Nov. 14, 2008 issued in U.S. Appl. No. 11/829,853 [P194C2].

U.S. Office Action dated Oct. 31, 2008 issued in U.S. Appl. No. 11/829,849 [P194C3].

U.S. Office Action dated Jun. 23, 2009 issued in U.S. Appl. No. 11/938,151 [P397].

U.S. Office Action Final dated Feb. 8, 2010 issued in U.S. Appl. No. 11/938,151 [P397].

U.S. Office Action dated Jul. 9, 2009 issued in U.S. Appl. No. 11/858,700 [P436].

U.S. Office Action Final dated Jan. 4, 2010 issued in U.S. Appl. No. 11/858,700 [P436].

U.S. Office Action Final dated Apr. 7, 2010 issued in U.S. Appl. No. 11/858,700 [P436].

U.S. Office Action dated Jul. 9, 2009 issued in U.S. Appl. No. 11/858,695 [P437].

U.S. Office Action Final dated Mar. 29, 2010 issued in U.S. Appl. No. 11/858,695 [P437].

U.S. Office Action Final dated Jan. 4, 2010 issued in U.S. Appl. No. 11/858,695 [P437].

U.S. Office Action dated Jul. 9, 2009 issued in U.S. Appl. No. 11/858,693 [P440].

U.S. Office Action Final dated Mar. 23, 2010 issued in U.S. Appl. No. 11/858,693 [P440].

U.S. Office Action dated Jul. 10, 2009 issued in U.S. Appl. No. 11/858,845 [P441].

U.S. Office Action Final dated Feb. 5, 2010 issued in U.S. Appl. No. 11/858,845 [P441].

U.S. Appl. No. 11/849,119, filed on Aug. 31, 2007 [P442].

U.S. Notice of Allowance dated Jun. 13, 2006 issued in U.S. Appl. No. 09/966,851 [P463].

U.S. Office Action dated Mar. 30, 2004 issued in U.S. Appl. No. 09/966,851 [P463].

U.S. Office Action Final dated Dec. 14, 2004 issued in U.S. Appl. No. 09/966,851 [P463].
U.S. Office Action dated Sep. 9, 2009 issued in U.S. Appl. No. 11/549,258 [P463X1].
U.S. Office Action Final dated Mar. 26, 2010 issued in U.S. Appl. No. 11/549,258 [P463X1].
U.S. Office Action dated Jun. 23, 2009 issued in U.S. Appl. No. 11/938,184 [P465].
U.S. Office Action Final dated Feb. 8, 2010 issued in U.S. Appl. No. 11/938,184 [P465].
U.S. Office Action dated Aug. 31, 2004 issued in U.S. Appl. No. 10/213,626 [P604].
U.S. Office Action Final dated Jan. 10, 2006 issued in U.S. Appl. No. 10/213,626 [P604].
U.S. Advisory Action dated Apr. 5, 2006 issued in U.S. Appl. No. 10/213,626 [P604].
U.S. Office Action dated Apr. 27, 2006 issued in U.S. Appl. No. 10/213,626 [P604].
U.S. Office Action Final dated Mar. 28, 2007 issued in U.S. Appl. No. 10/213,626 [P604].
U.S. Interview Summary dated Jul. 17, 2007 issued in U.S. Appl. No. 10/213,626 [P604].
U.S. Office Action dated Oct. 31, 2007 issued in U.S. Appl. No. 10/213,626 [P604].
U.S. Office Action Final dated Aug. 29, 2008 issued in U.S. Appl. No. 10/213,626 [P604].
U.S. Office Action dated Jul. 9, 2009 issued in U.S. Appl. No. 10/213,626 [P604].
U.S. Notice of Allowance and Examiner Interview Summary dated Mar. 1, 2010 issued in U.S. Appl. No. 10/213,626 [P604].
Australian Examination Report dated Sep. 22, 2005 issued in AU 29246/02.
Australian Notice of Opposition by Aristocrat Technologies dated Apr. 28, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
Australian Examination Report-1 dated Apr. 5, 2005 issued in AU2003227286 [P604AU].
Australian Examination Report-2 (as described by Applicant's Attorney) dated Feb. 26, 2009 issued in AU2003227286 [P604AU].
Australian Re-Examination Report dated May 1, 2009 issued in AU2003227286 [P604AU].
Australian Notice of Acceptance with Exam Comments dated Jan. 28, 2010 issued in AU2003227286 [P604AU].
Australian Examiner Communication regarding Claims dated Nov. 24, 2009 issued in AU2003227286 [P604AU].
Australian Examination Report-1 dated Jul. 23, 2007 issued in AU2006203570 [P604AUD1].
Australian Re-Examination Report-1 dated Dec. 2, 2009 issued in AU2006203570 [P604AUD1].
Australian Re-Examination Report2 dated Feb. 8, 2010 issued in AU 2006203570 [P604AUDI].
Australian Examiner Communication dated Feb. 5, 2010 issued in AU 2006203570 [P604AUD1].
Australian Notice of Acceptance with Examiner's Comments dated Nov. 15, 20/07 issued in AU2006202570 [P604AUD1].
European Examination Report dated Oct. 5, 2009 issued in EPO 7814629.7 [P194EP].
PCT International Preliminary Examination Report dated Mar. 3, 2009 issued in WO2008/028153 [P194WO].
PCT International Search Report dated Apr. 9, 2008 issued in WO 2008/028153 [P194WO].
PCT Written Opinion dated Mar. 3, 2009 issued in WO2008/028153 [P194WO].
PCT International Preliminary Examination Report dated May 19, 2008 issued in WO2008/063952 [P397WO].
PCT International Search Report and Written Opinion dated May 20, 2008 issued in WO2008/063952 [P397WO].
PCT International Search Report dated Dec. 18, 2008 issued in WO2009/039245 [P413WO].
PCT International Preliminary Examination Report dated May 19, 2008 issued in WO2008/063914 [P436WO].
PCT International Search Report dated May 7, 2008 issued in WO2008/063914 [P436WO].
PCT Written Opinion dated May, 19, 2008 issued in WO2008/063914 [P436WO].
PCT International Preliminary Examination Report dated May, 19, 2008 issued in WO2008/063956 [P437WO].
PCT International Search Report dated May, 14, 2008 issued in WO2008/063914 [P436WO].
PCT Written Opinion dated May, 14, 2008 issued in WO2008/063914 [P436WO].
PCT International Preliminary Examination Report dated May, 19, 2009 issued in WO2008063908 [P438WO].
PCT International Search Report dated May, 8, 2008 issued in issued in WO2008063908 [P438WO].
PCT Written Opinion dated May, 8, 2008 issued in issued in WO2008063908 [P438WO].
PCT International Preliminary Examination Report dated May, 19, 2009 issued in WO 2008/079542 [P440WO].
PCT International Search Report dated Jun. 11, 2008 issued in issued in WO 2008/079542 [P440WO].
PCT Written Opinion dated Jun. 11, 2008 issued in WO 2008/079542 [P440WO].
PCT International Preliminary Examination Report dated May 19, 2009 issued in WO 2008/063971 [P441WO].
PCT International Search Report dated May 20, 2008 issued in issued in WO 2008/063971 [P441WO].
PCT Written Opinion dated May 20, 2008 issued in WO 2008/063971 [P441WO].
PCT International Search Report dated Dec. 11, 2008 issued in issued in WO2009-039295 [P443WO].
PCT International Preliminary Examination Report dated May 12, 2009 issued in WO2008061068 [P334X6WO].
PCT International Search Report dated May 2, 2008 issued in issued in WO2008/061068 [P334X6WO].
PCT Written Opinion dated May 2, 2008 issued in WO2008/061068 [P334X6WO].
PCT International Search Report and Written Opinion dated Jul. 16, 2008 issued in for PWO2009/054861 [P462WO].
PCT Written Opinion dated Jul. 16, 2008 issued in WO2009/054861 [P462WO].
PCT International Preliminary Examination Report dated Apr. 15, 2009 issued in WO2008/048857 [P463X1WO].
PCT International Search Report and Written Opinion dated May 9, 2008 issued in for WO2008/048857 [P463X1WO].
PCT Written Opinion dated May 9, 2008 issued in WO2008/048857 [P463X1WO].
PCT International Preliminary Examination Report dated May 19, 2009 issued in WO 2008/063969 [P464WO].
PCT Search Report and Written Opinion dated May 20, 2008 issued in WO2008/063969 [P464WO].
PCT Written Opinion dated May 20, 2008 issued in WO 2008/063969 [P464WO].
PCT International Preliminary Examination Report dated May 19, 2009 issued in WO2008/063968 [P465WO].
PCT Search Report and Written Opinion dated Jul. 21, 2008 issued in WO2008/063968 [P465WO].
PCT Written Opinion dated Jul. 21, 2008 issued in WO2008/063968 [P465WO].
U.S. Appl. No. 12/849,284, filed Aug. 3, 2010, Silva, Gregory A.
U.S. Office Action dated Jul. 14, 2010 issued in U.S. Appl. No. 11/829,852 [P194C1].
U.S. Office Action dated Aug. 5, 2010 issued in U.S. Appl. No. 11/858,693 [P440].
U.S. Office Action dated Sep. 3, 2010 issued in U.S. Appl. No. 11/938,632 [P464].
U.S. Office Action dated Aug. 5, 2010 issued in U.S. Appl. No. 11/938,184 [P465].
U.S. Examiner Interview Summary dated Oct. 28, 2004 issued in U.S. Appl. No. 10/213,626 [P604].
U.S. Examiner Interview Summary dated Feb. 26, 2009 issued in U.S. Appl. No. 10/213,626 [P604].

U.S. Examiner Interview Summary dated Mar. 13, 2009 issued in U.S. Appl. No. 10/213,626 [P604].
U.S. Examiner Interview Summary dated Feb. 4, 2010 issued in U.S. Appl. No. 10/213,626 [P604].
European Examination Report dated Oct. 28, 2009 issued in EP07864281-6 [P397EP].
European Examination Report dated Oct. 28, 2009 issued in EP07872343.4 [P440EP].
European Examination Report dated Sep. 10, 2009 issued in EP07853965.7 [P463X1EP].
European Examination Report dated Oct. 28, 2009 issued in EP07854617.3 [P465EP].
PCT International Search Report dated Dec. 7, 2009 issued in WO2010039411 [P194X1WO].
PCT International Preliminary Examination Report dated Mar. 24, 2010 issued in WO2009/039245 [P413WO].
PCT Written Opinion dated Dec. 18, 2008 issued in WO2009/039245 [P413WO].
PCT International Search Report dated May 14, 2008 issued in WO2008/063914 [P436WO].
PCT Written Opinion dated May 14, 2008 issued in WO2008/063914 [P437WO].
PCT Written Opinion dated Dec. 11, 2008 issued in WO2009-039295 [P443WO].
PCT International Preliminary Examination Report dated Apr. 27, 2010 issued in WO2009-054861 [P462WO].
U.S. Office Action dated Jul. 9, 2010 issued in U.S. Appl. No. 11/858,849 [P413].
U.S. Office Action Final dated Aug. 5, 2010 issued in U.S. Appl. No. 11/858,700 [P436].
U.S. Notice of Allowance dated Oct. 4, 2010 issued in U.S. Appl. No. 10/213,626 [P604].
European Examination Report dated Oct. 28, 2009 issued in EP07844998.0 [P436EP].
PCT International Preliminary Examination Report dated May 19, 2009 issued in WO2008/063952 [P397WO].
PCT Written Opinion dated May 7, 2008 issued in WO2008/063914 [P436WO].
PCT International Preliminary Examination Report dated May 19, 2009 issued in WO2008/063914 [P436WO].
PCT International Search Report dated May 14, 2008 issued in WO2008-063956 [P437WO].
PCT International Preliminary Examination Report dated May 19, 2009 issued in WO2008063956 [P437WO].
US Office Action dated Mar. 30, 2010 issued in U.S. Appl. No. 11/938,086 [P190C1].
US Office Action Final dated Aug. 19, 2010 issued in U.S. Appl. No. 11/938,086 [P190C1].
US Office Action dated Dec. 3, 2010 issued in U.S. Appl. No. 11/938,086 [P190C1].
U.S. Office Action dated Oct. 18, 2010 issued in U.S. Appl. No. 11/514,808 [P194].
U.S. Notice of Abandonment dated Jun. 11, 2009 issued in U.S. Appl. No. 11/829,853 [P194C2].
U.S. Notice of Abandonment dated May 29, 2009 issued in U.S. Appl. No. 11/829,849 [P194C3].
US Office Action dated Aug. 29, 2007 issued in U.S. Appl. No. 10/755,598 [P197].
US Office Action Final dated Apr. 23, 2008 issued in U.S. Appl. No. 10/755,598 [P197].
US Office Action dated Oct. 8, 2008 issued in U.S. Appl. No. 10/755,598 [P197].
US Office Action Final dated Jul. 1, 2009 issued in U.S. Appl. No. 10/755,598 [P197].
US Office Action Final dated Jan. 22, 2010 issued in U.S. Appl. No. 10/755,598 [P197].
US Office Action Final dated Aug. 4, 2010 issued in U.S. Appl. No. 10/755,598 [P197].
US Office Action dated Oct. 31, 2008 issued in U.S. Appl. No. 11/829,917 [P197C1].
US Office Action Final dated Aug. 11, 2009 issued in U.S. Appl. No. 11/829,917 [P197C1].
US Office Action dated Jan. 29, 2010 issued in U.S. Appl. No. 11/829,917 [P197C1].
US Office Action Final dated Aug. 5, 2010 issued in U.S. Appl. No. 11/829,917 [P197C1].
U.S. Advisory Action dated Apr. 22, 2010 issued in U.S. Appl. No. 11/938,151 [P397].
U.S. Office Action dated Jul. 23, 2010 issued in U.S. Appl. No. 11/938,151 [P397].
U.S. Office Action Final dated Jan. 4, 2011 issued in U.S. Appl. No. 11/938,151 [P397].
U.S. Office Action dated Nov. 30, 2010 issued in U.S. Appl. No. 11/858,849 [P413].
U.S. Office Action Final dated Dec. 27, 2010 issued in U.S. Appl. No. 11/858,700 [P436].
U.S. Office Action Final dated Jul. 7, 2010 issued in U.S. Appl. No. 11/858,695 [P437].
U.S. Advisory Action dated Jun. 1, 2010 issued in U.S. Appl. No. 11/858,693 [P440].
U.S. Office Action Final dated Feb. 7, 2011 issued in U.S. Appl. No. 11/858,693 [P440].
U.S. Notice of Panel Decision from Pre-Appeal Brief Review dated Jun. 8, 2010 issued in U.S. Appl. No. 11/858,845 [P441].
U.S. Office Action dated Nov. 12, 2010 issued in U.S. Appl. No. 11/859,127 [P443].
U.S. Office Action dated Jan. 20, 2011 issued in U.S. Appl. No. 11/983,770 [P334X6].
U.S. Office Action dated Jun. 13, 2003 issued in U.S. Appl. No. 09/966,851 [P463].
U.S. Office Action dated Jul. 9, 2010 issued in U.S. Appl. No. 11/549,258 [P463X1].
U.S. Office Action Final dated Dec. 21, 2010 issued in U.S. Appl. No. 11/549,258 [P463X1].
U.S. Office Action Final dated Dec. 15, 2010 issued in U.S. Appl. No. 11/938,632 [P464].
U.S. Examiner Interview Summary dated Nov. 14, 2010 issued in U.S. Appl. No. 11/938,184 [P465].
U.S. Office Action Final dated Jan. 20, 2011 issued in U.S. Appl. No. 11/938,184 [P465].
US Office Action dated Nov. 17, 2004 issued in U.S. Appl. No. 10/376,852 [P544].
US Office Action dated Apr. 13, 2005 issued in U.S. Appl. No. 10/376,852 [P544].
US Office Action Final dated Nov. 18, 2005 issued in U.S. Appl. No. 10/376,852 [P544].
US Advisory Action dated Feb. 7, 2006 issued in U.S. Appl. No. 10/376,852 [P544].
US Office Action dated Sep. 19, 2006 issued in U.S. Appl. No. 10/376,852 [P544].
US Notice of Informal or Non-Responsive Amendment dated Mar. 9, 2007 issued in U.S. Appl. No. 10/376,852 [P544].
US Office Action Final dated Jun. 22, 2007 issued in U.S. Appl. No. 10/376,852 [P544].
US Office Action dated Jan. 28, 2008 issued in U.S. Appl. No. 10/376,852 [P544].
US Office Action Final dated Aug. 6, 2008 issued in U.S. Appl. No. 10/376,852 [P544].
US Office Action dated Feb. 2, 2009 issued in U.S. Appl. No. 10/376,852 [P544].
US Notice of Allowance dated 1Nov. 10, 2009 issued in U.S. Appl. No. 10/376,852 [P544].
US Office Action dated Mar. 25, 2010 issued in U.S. Appl. No. 10/376,852 [P544].
US Notice of Abandonment dated Oct. 27, 2010 issued in U.S. Appl. No. 10/376,852 [P544].
PCT International Search Report dated May 25, 2005 issued in WO 2005/071629 [P197WO].
PCT Written Opinion dated May 25, 2005 issued in WO 2005/071629 [P197WO].
PCT International Preliminary Report on Patentability and Written Opinion dated Jul. 17, 2006 issued in WO 2005/071629 [P197WO].
Australian Examiner's First Report dated Nov. 12, 2009 issued in AU2005207309 (P197AU).

Australian Examiner's Report No. 2 dated Sep. 15, 2010 issued in AU Application No. 2005207309 (P197AU).
Chinese First Office Action dated Nov. 28, 2008 issued in CN2005800022940 (P197CN).
Chinese Second Office Action dated Sep. 25, 2009 issued in CN2005800022940 (P197CN).
Chinese Third Office Action dated May 11, 2010 issued in CN2005800022940 (P197CN).
EP Examination Report dated Sep. 13, 2007 issued in EP 05 705 315.9 (P197EP).
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
EP Examination Report dated Oct. 28, 2009 issued in EP 07 845 059.0 1238 [P334X6EP].
PCT International Search Report dated May 20, 2008 issued in WO 2008/063952 [P397WO].
European Examination Report dated Oct. 28, 2009 issued in EP 07 845 062.4 [P441EP].
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated May 17, 2007 issued in AU 2004216952 (P544AU).
Australian Examiner's Report No. 2 dated Jul. 30, 2007 issued in AU 2004216952 (P544AU).
Australian Examiner's Report No. 3 dated May 28, 2008 issued in AU 2004216952 (P544AU).
Japanese Description of Office Action dated Jul. 4, 2006 issued in Application No. 2005-518567.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
Newton, Harry, Newton's Telecom Dictionary, Jan. 1998, Telecom Books and Flatiron Publishing, p. 399.

\* cited by examiner

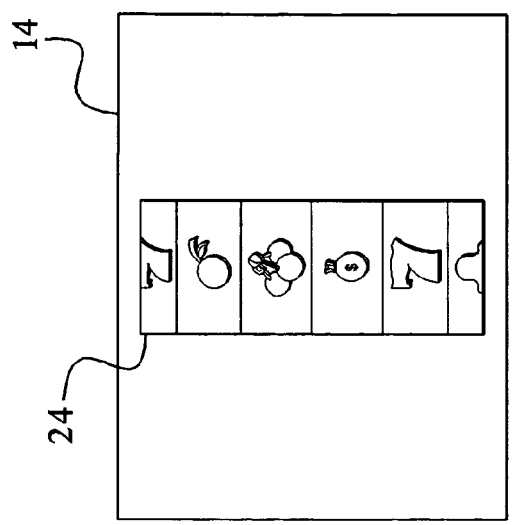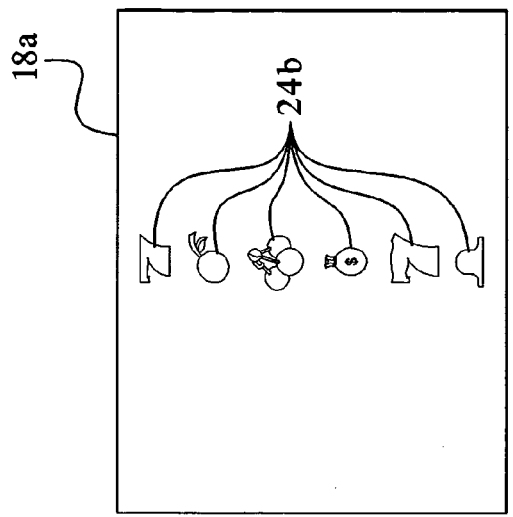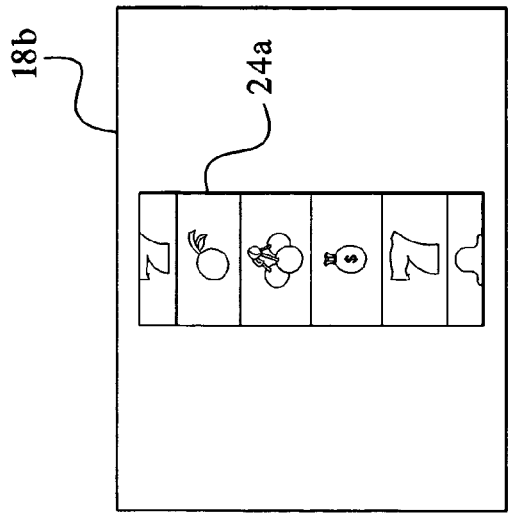

GAMING DEVICE HAVING A THREE DIMENSIONAL DISPLAY DEVICE

PRIORITY CLAIM

This application is a continuation of, claims priority to and the benefit of U.S. patent application Ser. No. 10/213,626, filed on Aug. 6, 2002, the entire contents of which are incorporated herein.

CROSS-REFERENCE TO RELATED APPLICATIONS

This application is related to the following commonly-owned co-pending patent applications: "TRAJECTORY-BASED 3-D GAMES OF CHANCE FOR VIDEO GAMING MACHINES," Ser. No. 10/187,343; "TRAJECTORY-BASED 3-D GAMES OF CHANCE FOR VIDEO GAMING MACHINES," Serial No. PCT/US03/18028; "VIRTUAL CAMERAS AND 3-D GAMING ENVIRONMENT IN A GAMING MACHINE," Ser. No. 09/927,901, now U.S. Pat. No. 6,887,157; "3D REELS AND 3D WHEELS IN A GAMING MACHINE," Ser. No. 10/674,884; "3D REELS AND 3D WHEELS IN A GAMING MACHINE," Serial No. PCT/US03/31138; "3D TEXT IN A GAMING MACHINE," Ser. No. 10/676,719; "GAME INTERACTION IN 3-D GAMING ENVIRONMENTS", Ser. No. 10/803,233; "VIRTUAL CAMERAS AND 3-D GAMING ENVIRONMENTS IN A GAMING MACHINE", Ser. No. 11/112,076; "METHODS AND DEVICES FOR DISPLAYING MULTIPLE GAME ELEMENTS", Ser. No. 11/481,666; "VIRTUAL CAMERAS AND 3-D GAMING ENVIRONMENTS IN A GAMING MACHINE", Ser. No. 11/829,807; "3D TEXT IN A GAMING MACHINE," Serial No. PCT/US03/31158; "GAMING DEVICE HAVING A THREE DIMENSIONAL DISPLAY DEVICE," Ser. No. 10/213,626; "MULTIPLE-STATE DISPLAY FOR A GAMING APPARATUS," Ser. No. 10/755,598; "GAMING MACHINE WITH LAYERED DISPLAYS," Ser. No. 11/514,808; "MULTIPLE-STATE DISPLAY FOR A GAMING APPARATUS," Serial No. PCT/US05/00597; "GAMING MACHINE WITH LAYERED DISPLAYS", Ser. No. 11/829,849; "GAMING MACHINE WITH LAYERED DISPLAYS", Ser. No. 11/829,852; and "GAMING MACHINES WITH LAYERED DISPLAYS", Ser. No. 11/829,853; "METHOD AND APPARATUS FOR USING A LIGHT VALVE TO REDUCE THE VISIBILITY OF AN OBJECT WITHIN A GAMING APPARATUS", Ser. No. 11/938,086; "MULTIPLE-STATE DISPLAY FOR A GAMING APPARATUS", Ser. No. 11/829,917; "PRESENTATION OF WHEELS ON GAMING MACHINES HAVING MULTI-LAYER DISPLAYS", Ser. No. 11/938,151; "SEPARABLE BACKLIGHTING SYSTEM", Ser. No. 11/877,611; and "SINGLE PLANE SPANNING MODE ACROSS INDEPENDENTLY DRIVEN DISPLAYS", Ser. No. 11/938,632.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a three dimensional display device. Contemporary gaming devices such as slot machines, video poker machines, video blackjack machines and video keno machines, include display devices which generate two-dimensional images such as visual representations of symbols, characters and other game-related images which appear in primary games, secondary games, help screens, attract modes and other displays of the gaming devices.

Certain known gaming devices generate three dimensional images using traditional perceived-type or virtual three dimensional display devices. The virtual three dimensional images involve shading and highlighting techniques as well as perspective techniques for selectively positioning different parts of images to create the perception of depth. These virtual three dimensional image creating techniques cause the human eye to perceive a depth in the image when in fact there is no real depth because the images are physically displayed in a single plane on a single display screen.

Certain known gaming devices have attempted to generate more realistic appearing virtual three dimensional representations by using beam splitters and parallel mirrors. Some of the disadvantages of such techniques are the relatively large space in the gaming device required to house beam splitters and mirrors, and the relatively small field of view available to a player. Accordingly, there is a need for a gaming device which generates three dimensional images which are formed in three actual dimensions and which provides three dimensional images in a suitably sized gaming device.

In addition, though most gaming devices include one display device, some include two display devices such as an upper display and a lower display or side by side displays to provide two different displays to a player. The gaming devices use these multiple display devices to provide different information to the player or difference games to the player. Use of the upper and lower or side by side display devices may for certain players be inconvenient or distracting because the multiple screens require a player to change his or her line of sight from one display device to another. Accordingly, there is need for a gaming devices which includes one display device which enables a player to simultaneously view different images on different screens by looking at and through only one display screen.

SUMMARY OF THE INVENTION

The present invention overcomes the above shortcomings by providing a gaming device which has a display device which includes a plurality of aligned display surfaces, members or screens which produce three dimensional images. One embodiment of the display device of the present invention includes a plurality of such as two co-acting aligned display screens which form a single display device. In one embodiment, one or more of the display surfaces, members or screens have at least one viewing surface which is or has the capacity to be see-through and preferably is transparent. The display surfaces, members or screens are primarily referred to herein as display screens. In one embodiment, the display screens are separated by a predetermined distance to facilitate the creation of images having various depths. Different parts of the three dimensional image are displayed simultaneously on the different display screens. The three dimensional image has actual x, y and z coordinates or dimensions. The z-dimension is the depth or distance which separates the display screens. This display device also is adapted to simultaneously display different images on different screens to provide information to the player in the player's line of site.

More specifically, each display screen provides a viewing surface or face, or any suitable medium for displaying one or more images (partial or whole) to a player. Each display screen is adapted to display portions of the image, images or different images to create the three-dimensional images. Such images thus have actual or physical dimensions (i.e., the images have a width, height and an actual depth because of the distance between the different images or parts of the image(s) on different display screens). The width and height are measured along the x-axis and y-axis on the viewing surfaces or faces of the display screens. The depth is measured along the z-axis which extends through multiple display screens along a line which is generally perpendicular to the facial planes of the display screens.

In one embodiment, the gaming device of the present invention includes a cabinet or other suitable housing which houses the display device, a touch screen sensor, and a processor connected to a memory device and adapted to control the operation of the gaming device, including player controls, input devices and the display device. The cabinet can include any suitable frame which supports the display device and the other conventional mechanical and electrical components of the gaming device.

As indicated above, the display device of one embodiment of the present invention, which is adapted to receive signals from the processor and to generate and display images to a player, includes a plurality of display screens which each generate certain images or portions of images. In one embodiment, the display device includes two display screens, including a first, frontmost or exterior display screen and a second, underlying or interior display screen. The two display screens are mounted, oriented and aligned within the cabinet in such a manner that at least one and preferably a plurality of lines of sight intersect both of the viewing surfaces or faces of the display screens.

In one embodiment, a predetermined distance "D" separates the display surfaces of the two display screens. It should be appreciated that the display screens can be positioned, mounted or stacked with a distance separating the display surfaces and no distance or space separating the display screens.

The display screens are preferably positioned in different planes which are parallel to one another. However, it should be appreciated that the display screens can be positioned in planes which are not parallel to one another, provided that at least one (and preferably a plurality) of lines of sight intersect the display surfaces of the plurality of the display screens. Also, the display screens are preferably substantially flat, although it should be appreciated that the display screens can have any suitable shape, such as concave and convex shapes and non-uniform shapes.

The two display screens co-act to display one or more three-dimensional images to the player each comprising a plurality of images and in particular at least one image on each screen. The display screens may also co-act to display a three dimensional image by separately displaying different parts of the whole image or the display screens. In this embodiment, the frontmost display screen displays one part, portion or section of the three-dimensional image and the underlying display screen displays another part, portion or section of the three-dimensional image. As a result, the gaming device displays a three-dimensional representation of the whole image to the player. This representation is formed in three physical or actual dimensions: an x-dimension and y-dimension on the exterior display screen and an x-dimension and y-dimension on the interior display screen. The representation of the depth or z-dimension of the image is at least partially dependent upon or based upon the distance D which separates the two display screens and the x-dimension and y-dimensions on each of the display screens. In a further embodiment, both of the display screens can display virtual three dimensional images, thereby providing a multi-dimensional image. It should be appreciated that other variations and combinations of variations of displaying images, parts of images, and multiple images are contemplated by the present invention.

The depth which a player sees in the three dimensional image or representation is the actual depth D. The gaming device of the present invention can also cause a player to perceive a depth which is based upon or derived from the actual depth D. For example, the gaming device processor can multiply the depth D by a factor to generate a perceived depth which is greater than or less than the actual depth D. In one such embodiment, the x-dimension and y-dimensions on one or all of the display screens can be modified to change the apparent depth of the image as seen by the player.

In another embodiment of the gaming device of the present invention, the display device includes a first, frontmost or exterior display screen, a second, central or intermediate display screen and a third, backmost or interior display screen. In this embodiment, each display screen can display one or more different images. The frontmost display screen and the intermediate display screen preferably have or provide transparent translucent portions. When a player views the display through the frontmost display screen, the player sees a displayed image which includes representations in three actual dimensions. The depth of the image depends in part upon which display screen is used to display the parts of the particular image and spacing of the screens.

As indicated above, it should be appreciated that the images generated on each display screen can also be virtual three dimensional images, as well as two-dimensional images. The gaming device can display such virtual three dimensional images on one or more of the display screens. The gaming device of the present invention can use these images to generate any suitable combination of virtual and actual three dimensional images. The gaming device of the present invention can also use both of these types of three dimensional representations to generate a single three-dimensional image.

In addition to the three dimensional function of the gaming device, the gaming device of the present invention can also use the display device to display different images on the different display screens which a player can simultaneously view by looking at and thus through at least the exterior display screen. In one example, the exterior display screen displays a video reel image on one portion of the frontmost display screen while the other portions of the exterior display screen are transparent. The interior display screen displays a paytable image and a background image. When the frontmost display screen and the underlying display screen both display their images simultaneously, the player can simultaneously view the overall graphical representation or display of the reel image, paytable image and background image.

In another example, the gaming device generates a game image on the exterior display screen and a flashing translucent image on the interior display screen. The game image could, for instance, be reels or one or more wheels, and the underlying flashing image could be a payline or a symbol or message which provides a player with helpful information such as a hint for playing the game. In operation, the player could play the game while periodically viewing the flashing image without having to change his or her line of sight or having to independently request such information. In a similar embodiment, a background such as a dealer could be displayed on the interior display screen and cards could be displayed on the exterior display screen. This provides the player with a three dimensional view of the card game.

In one embodiment of the gaming device, the display device includes a pressure sensitive touch screen. This touch screen detects or senses pressure and also varying degrees of pressure applied by a player to the touch screen. This pressure is generally applied by the player substantially along the z-axis. Using one or more programs stored within the memory device, the processor of the gaming device enables a player to activate game elements or functions in a conventional manner by providing pressure to that touch screen.

In one embodiment, the display screens are relatively flat and thin. For instance, in one embodiment, the display screen may each be an LCD panel with a light source (for backlighting) disposed behind the interior LCD panel. In another embodiment, the display device includes two display screens which are relatively flat and thin and backmost interior image or light source. For example, in such embodiment, the backmost image or light source may be a cathod ray tube (CRT) or other light source such as a plasma screen.

In one embodiment of the present invention, the exterior display screen is always or has the capacity to be completely or partially see-through such as being translucent or transparent at predetermined times. The interior underlying display screen can have this same capacity, or it can be permanently non-transparent or opaque. When the frontmost display screen is transparent or translucent, a player can see the images displayed on the frontmost display screen as well as the images located behind the frontmost display screen and particularly the images displayed by the underlying display screen. In one embodiment, if the underlying display screen is also transparent or translucent, the underlying display screen preferably includes a background image or layer which prevents a player from seeing through the underlying display screen into the interior of the cabinet of the gaming device.

In another embodiment of the present invention, a biometric sensor such as a camera or other suitable device is employed to detect the position of head player. When the player's head moves (i.e., moves left, right, up or down) the images on the interior and exterior display screen shift to provide a visual impression to the player that the player can look around the object or images on the display device and provides an overall better sense of reality.

It is therefore an advantage of the present invention to provide a gaming device having a three-dimensional display device.

Another advantage of the present invention is to provide a gaming device having a display device which includes multiple display screens, wherein the exterior display screen is completely or partially transparent or translucent.

Another advantage of the present invention is to provide a gaming device which displays images in three actual dimensions.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIGS. 1B and 1C are front views of interior and exterior display screens of one embodiment of the gaming device of the present invention, wherein the interior display screen of FIG. 1B displays a reel with symbols and the exterior display screen displays the symbols of the reel.

FIG. 1D is a front view of the two display screens of FIGS. 1B and 1C which display the reel with the symbols in three dimensions.

DETAILED DESCRIPTION OF THE INVENTION

Figure 1A:
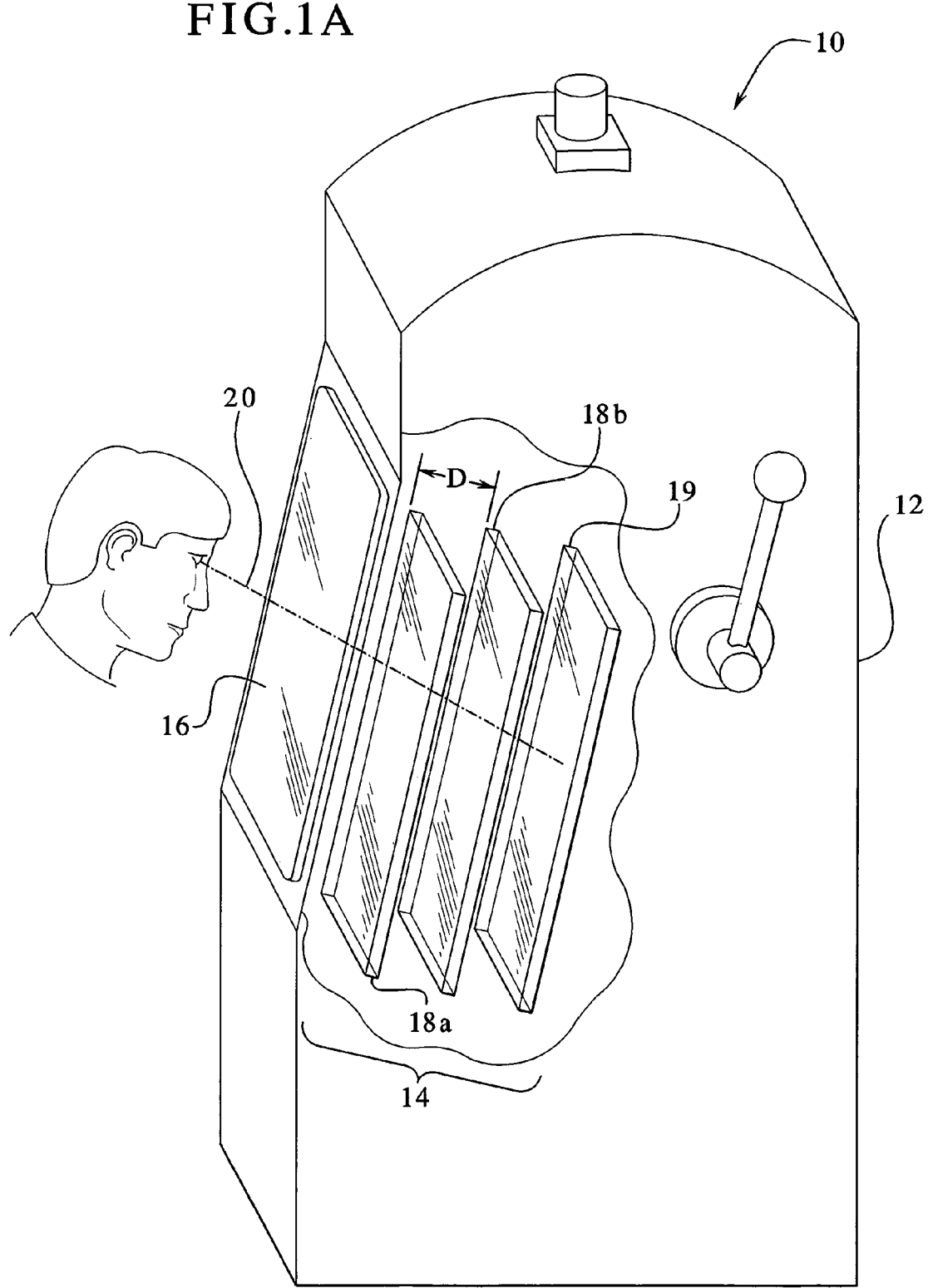
FIG. 1A is a perspective view of one embodiment of the gaming device of the present invention, illustrating a touch screen, an exterior display screen, an interior display screen and a light source.
Figure 8A:
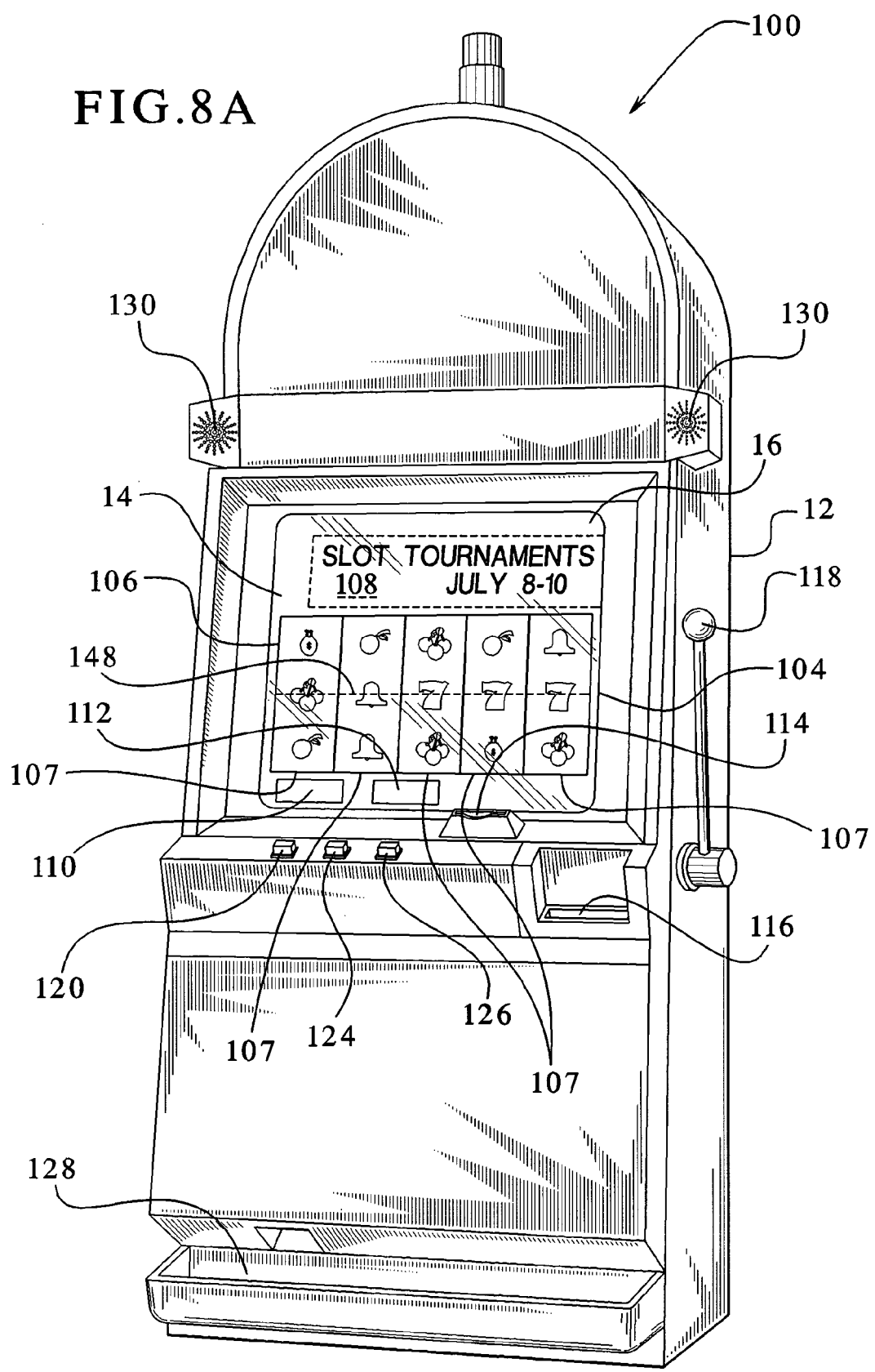
FIG. 8A is a perspective view of the gaming device of one embodiment of the present invention, illustrating a display device which enables a player, by looking at and through the exterior display screen, to view a display which includes different images and information generated by the exterior display screen and the interior display screen.
Figure 8B:
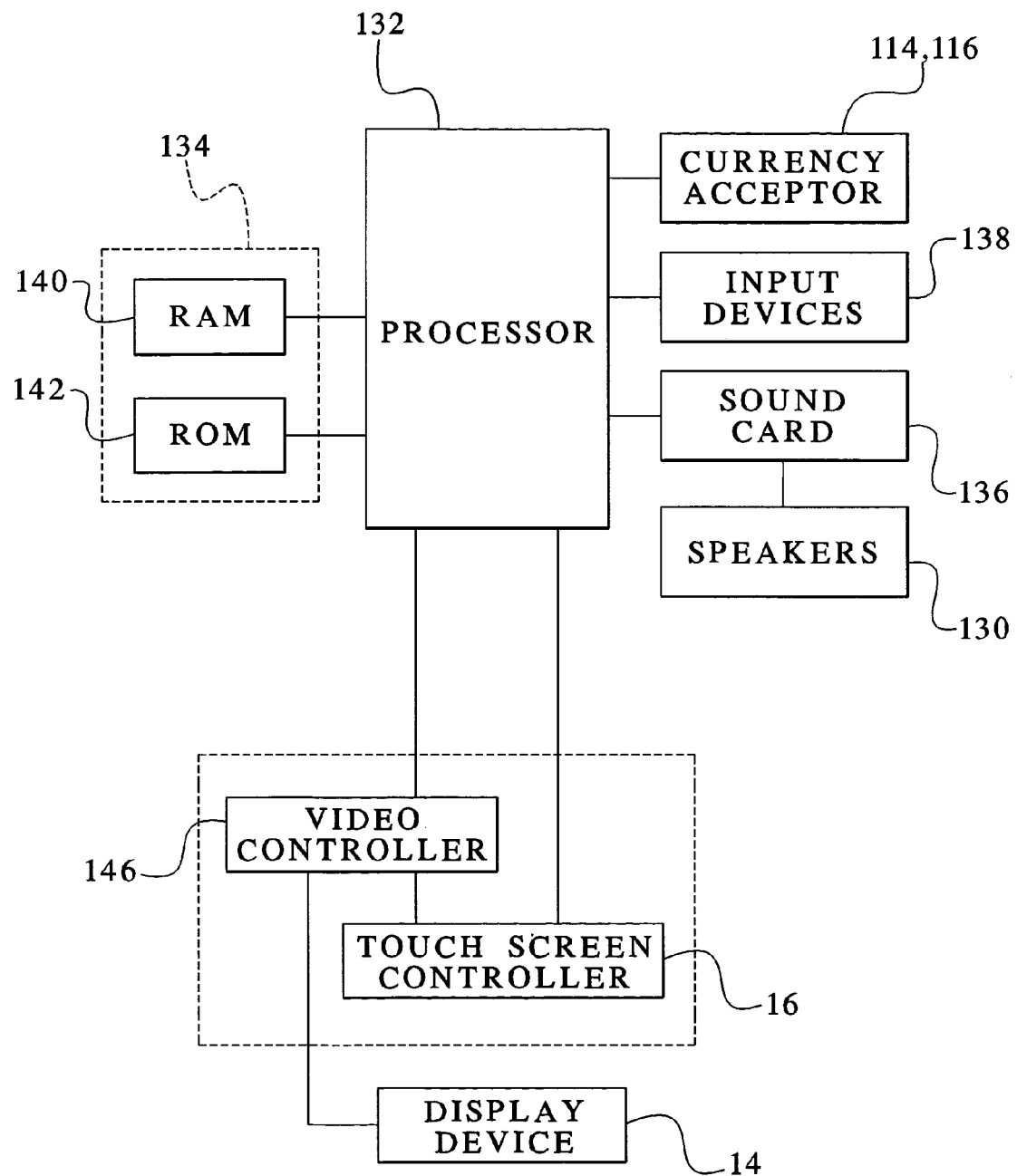
FIG. 8B is a schematic block diagram of the electronic configuration of one embodiment of the gaming device of the present invention.

Referring now to FIGS. 1A and 8B, the gaming device 10 of one embodiment of the present invention includes a cabinet or housing 12 which houses a display device 14, touch screen 16 and a processor 132 connected to a memory device 134 and in communication with the display device and the touch screen. The processor controls the operation of gaming device 10 and, in particular, the game(s) provided by the gaming device, player inputs using the touch screen, other input devices and the display device 14. It should be appreciated that the gaming device of the present invention can provide the display device without the touch screen 16.

In one embodiment, the display device 14, which, under the control of the processor, generates and displays three-dimensional images to a player, includes a plurality of display screens which each are adapted to generate images or parts of images. In one embodiment, the display device 14 includes at least one light source such as a back light which functions with the display screens to make the images viewable to the player. In the example illustrated in FIG. 1A, the display device 14 includes two display screens including a first, exterior or frontmost display screen 18a and a second, interior, backmost or underlying display screen 18b. The two display screens 18a and 18b are mounted and oriented within the cabinet 12 in such a manner that at least one straight line of sight 20 intersects both of the faces or display surfaces of the display screens 18a and 18b. Preferably, the screens are completely aligned as illustrated in FIG. 1A and provide a plurality of straight lines of sight which intersect both faces of the display screen. A back lighting source 19 is positioned behind and aligned with the screens 18a and 18b.

The two display screens 18a and 18b are separated by a predetermined distance D which is the distance from the display surface of display screen 18a to display surface of display screen 18b. This distance can be any suitable predetermined distance desired by the gaming device manufacturer. It should be appreciated that in one embodiment, the display screens can be positioned adjacent to each other such that only the thickness of the display screens separates the display surfaces which provide three-dimensional image. In such case, the distance D depends on the thickness of the exterior display screen.

As discussed in more detail below, the exterior display screen 18a is translucent or transparent, or alternatively has the capacity to be translucent or transparent under the control of the processor. As discussed in more detail below, the interior display screen 18b can be any suitable device adapted to display the images. In one embodiment, the interior display screen is translucent or transparent, or has the capacity to be translucent or transparent. When the exterior display screen 18a is transparent or translucent, a player can see the images displayed on the exterior display screen 18a as well as the images displayed on the interior display screen (i.e., by looking through the transparent exterior display screen). Accordingly, the present invention can display co-acting or overlapping images to a player to enable a player to play a wagering game or provide other game functions or game related functions. In certain embodiments, the present invention also provides three dimensional images which comprise corresponding images on each display screen. The corresponding images on each display screen provide an image viewable to a player which has three actual dimensions based on the distance D between the display surfaces of the display screens. In the embodiment where the interior display screen 18b is transparent or translucent, the interior display screen preferably includes a light source such as a back light source 19.

The display screens 18a and 18b are preferably positioned in different but parallel planes. However, it should be appreciated that the display screens 18a and 18b can be positioned in planes which are not parallel to one another. Also, the display screens 18a and 18b are preferably substantially flat, although it should be appreciated that the display screens 18a and 18b can have any suitable shape, such as concave and convex shapes and non-uniform shapes.

As illustrated in FIGS. 1B, 1C and 1D, the two display screens 18a and 18b co-act to display a three dimensional image on the display device 14 such as a reel 24 of a slot machine. In the example illustrated in FIGS. 1B, 1C and 1D, the interior display screen 18b displays the image of the reel 24 including the symbols and the exterior display screen 18a displays the symbols 24b. As a result, the gaming device 10 displays a three-dimensional image of the reel 24 to the player as illustrated in FIG. 1D. This representation or image is formed in three actual dimensions. The depth or z-dimension of image of the symbols is equal to or otherwise based on or derived from the distance D which separates display surfaces of the display screens 18a and 18b. This type of three-dimensional representation is relatively highly engaging and interesting to players because the image of the reel and specifically symbols on the reel is actually formed or generated in all three dimensions.

The depth which a player sees in the three-dimensional image or representation is the actual depth D. Although not shown, the gaming device may also cause a player to perceive a depth which is based upon or derived from the actual depth D. For example, the gaming device can multiply the depth D by a numerical factor to generate a perceived depth which is greater than or less than the actual depth D. It should be understood that the gaming device can include any suitable ratio of the magnitude of the depth perceived by a player to the magnitude of the actual distance or depth D. It is preferable, however, that this ratio be a fractional value equal to or greater than one. The dimensions of the x- and y-dimensions on each display screen can also be modified to change the apparent depth as seen by the player.

Figure 1G:
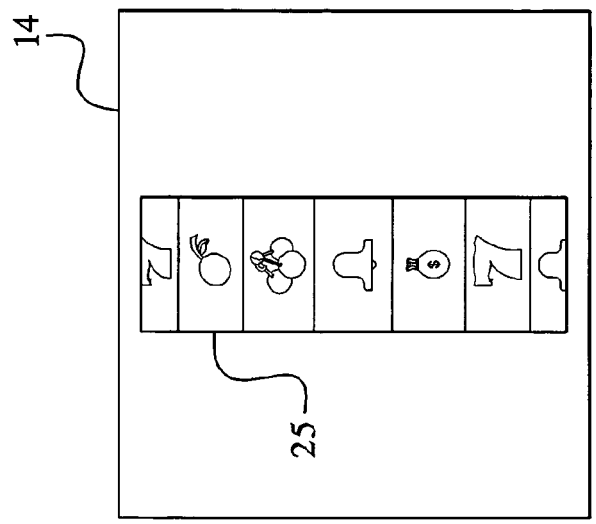
FIG. 1G is a front view of the three-dimensional image of the reel displayed on the two display screens of FIGS. 1E and 1F.
Figure 1F:
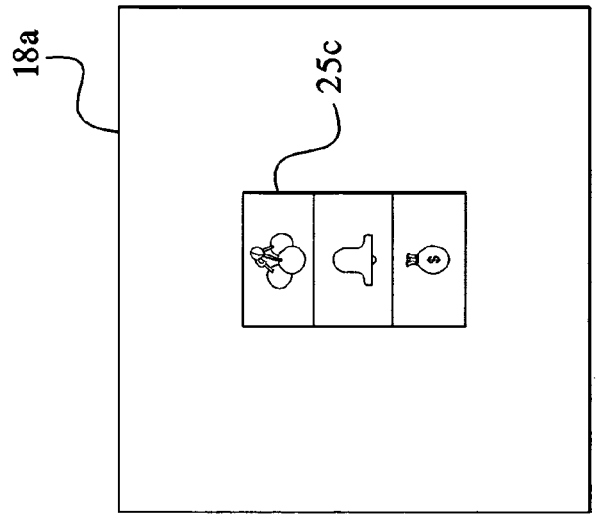
FIGS. 1E and 1F are front views of the interior and exterior display screens of one embodiment of the gaming device, wherein the back part of one image of a reel is illustrated in FIG. 1E and the front part of the image is illustrated in FIG. 1F.
Figure 1E:
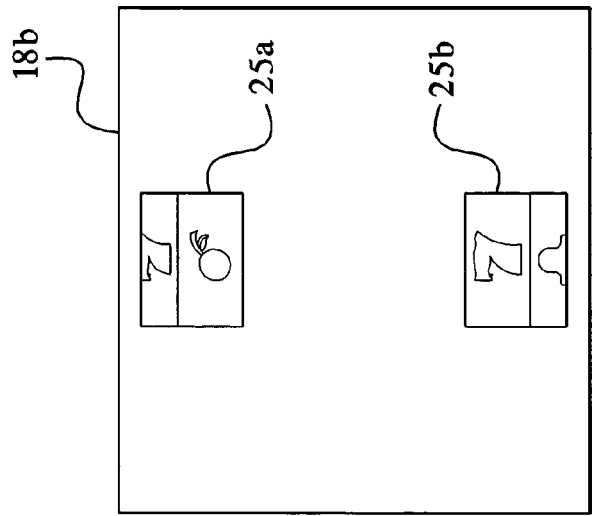

In FIGS. 1E, 1F and 1G, the display screens co-act to display a three dimensional image of the reel 25. In this example, the interior display screen 18b displays the upper and lower portions 25a and 25b which are not as close to the player, and the exterior display screen 18a displays the central portion 25c of the reel which would be closer to the player. As a result the gaming device displays a three-dimensional image of reel 25 to the player as illustrated in FIG. 1G. This image is formed in three actual dimensions wherein the front portion 25c of the reel is displayed closer on the frontmost screen closer to the player then the rear portions 25a and 25b which are displayed on the interior display screen which are further away from the player. The depth or z-dimension of the image of the reel 25 is equal to or otherwise based or derived from the distance D which separates the display surfaces of the display screens 18a and 18b.

Figure 2A:
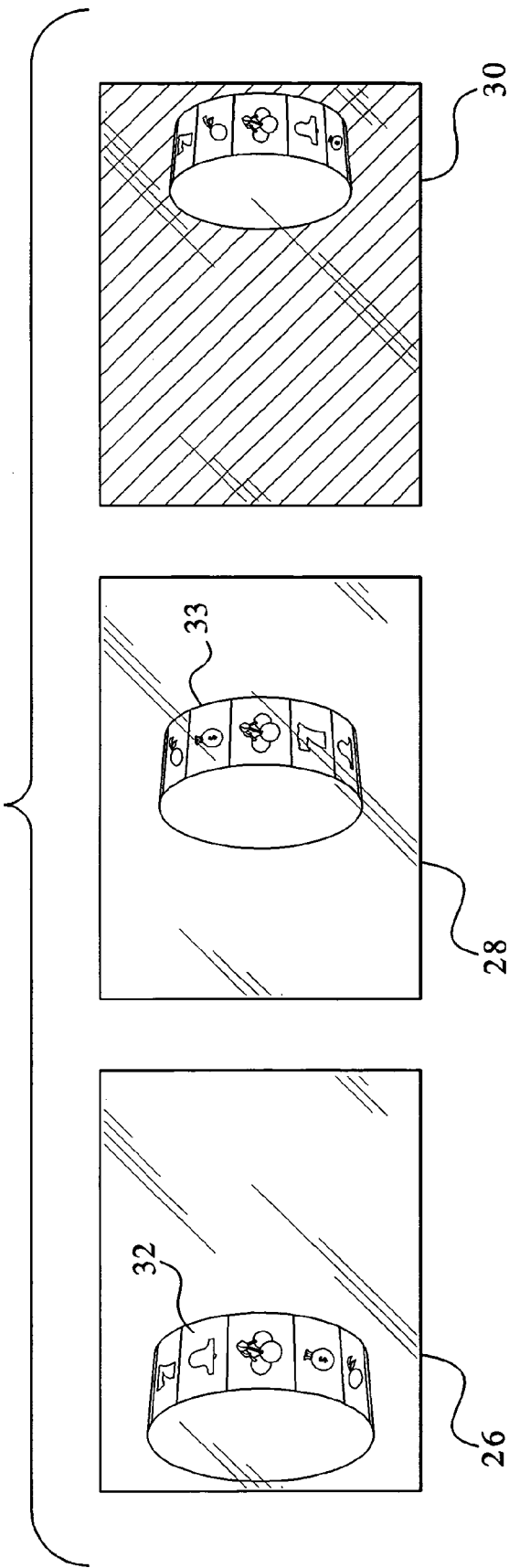
FIG. 2A is an exploded front view of separate three dimensional reel images displayed by an exterior display screen (left side), an intermediate display screen (middle) and an interior display screen (right side) of one embodiment of the present invention.
Figure 2B:
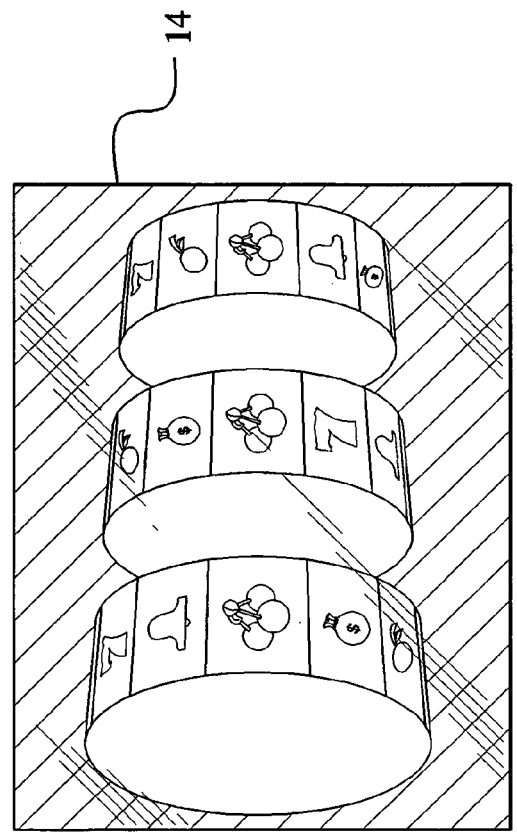
FIG. 2B is a front view of the three dimensional reel images and display screens of FIG. 2A which a player sees when looking at and through the exterior display screen of FIG. 2A.

In another embodiment of the gaming device of the present invention illustrated in FIGS. 2A and 2B, the display device includes an exterior or frontmost display screen 26, a middle or intermediate display screen 28 and an interior or backmost display screen 30. The frontmost display screen 26 displays a virtual three dimensional first reel image 32 on one portion of the first display screen 26. All other portions of the first display screen 26 are translucent or transparent. The second display screen 28 displays a virtual three dimensional second reel image 33 on one portion of the second display screen 28, while all other portions of the middle display screen 18 are translucent or transparent. The third display screen 30 displays a virtual three dimensional third reel image 34 and a background image 36 covering the entire portion of the backmost display screen. These three display screens 26, 28 and 30 simultaneously display each respective image to enable a player to see the overall virtual three dimensional image of all three reels in a three-dimensional format by looking through the first display screen 26 of the display device 14 as specifically illustrated in the FIG. 2B.

Although it is not readily apparent by viewing FIG. 2B, the overall graphical representation, image or display (whether still or animated) provides a relatively highly engaging three-dimensional representation because the three reel images are formed in different planes. Specifically, the representation of reel 32 being closer to the player than the reel 33 is based upon and determined by the actual distance between the first display screen 26 and the second display screen 28. Similarly, the representation of the reel 33 being closer to the player than the reel 34 is based upon and determined by the actual distance (not shown) which separates the second display screen 28 from the third display screen 30.

It should be understood that the reels images shown in FIGS. 1B to 1G, 2A and 2B are merely illustrative. In these illustrations, by simultaneously displaying different images (partially or wholly) on different display screens, the overall image the gaming device generates is a three-dimensional representation formed in the three actual dimensions. It should also be appreciated from these illustrations that the images can be two-dimensional images combined to create three-dimensional images or conventional perceived-type or virtual three dimensional representations which are combined to create three dimensional images. In some instances, the gaming device can use both of these types of representations to generate a three-dimensional images.

Figure 3A:
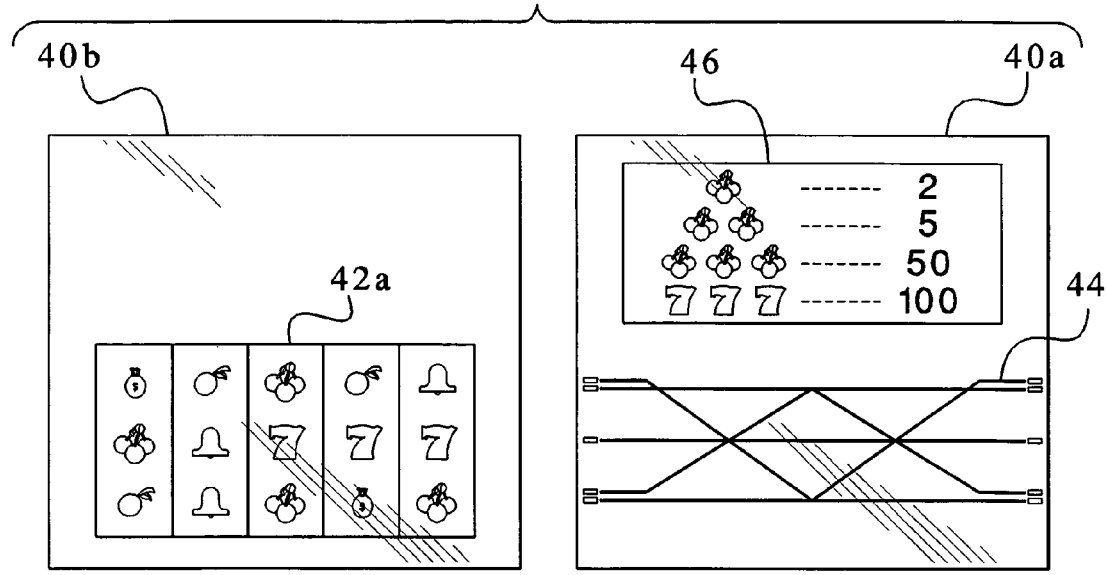
FIG. 3A is an exploded front view of a reel image on the interior display screen (left side) and a paytable image and payline image on the exterior display screen (right side).
Figure 3B:
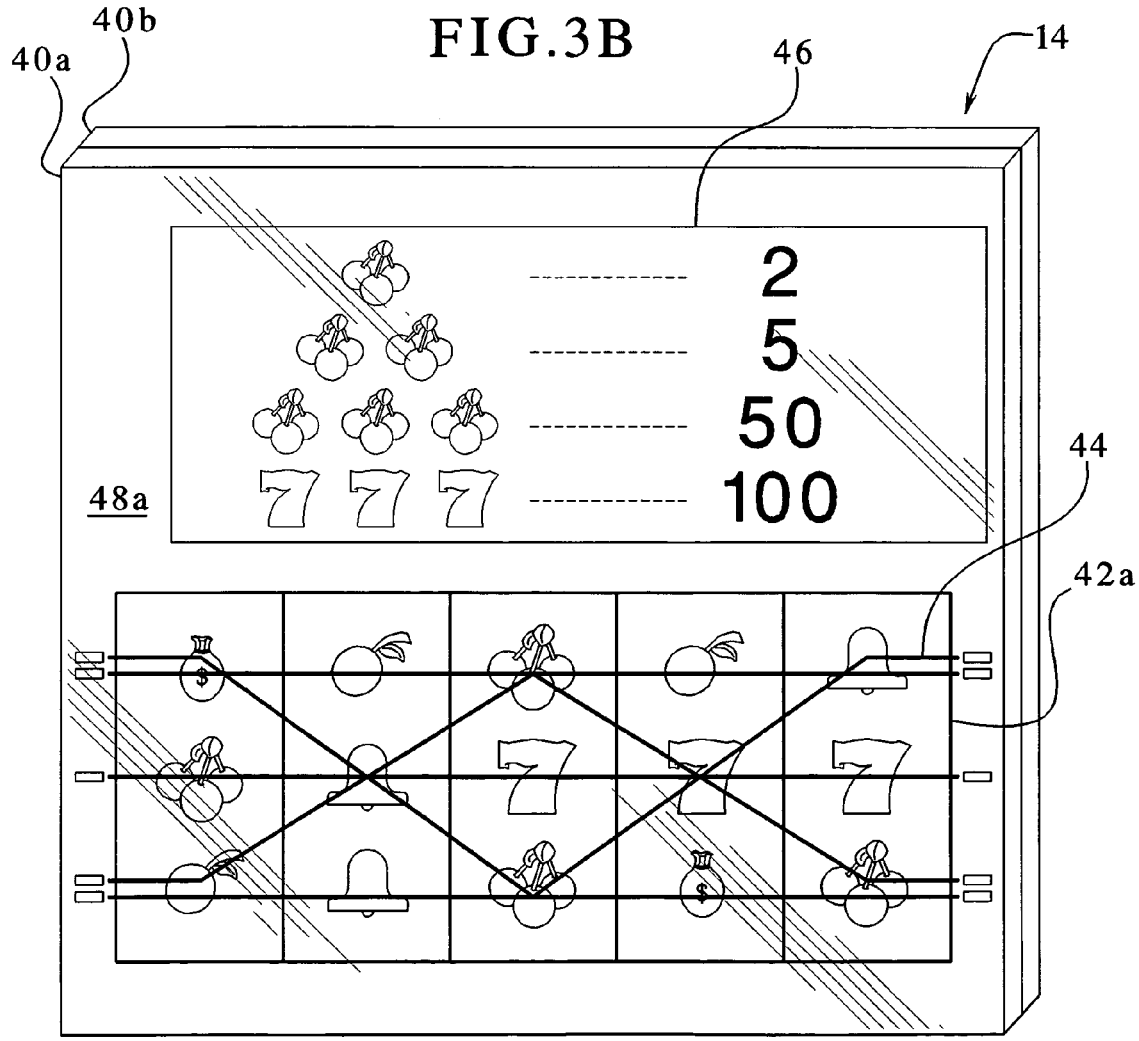
FIG. 3B is a perspective view of the reel, paytable and payline images on the display screens of FIG. 3A which a player sees when looking at and through the exterior display screen of FIG. 3A.

In addition to displaying three dimensional representations, in other embodiments of gaming device, the display device can display different images or information on different display screens which a player can view by looking at and through the exterior screen. In one example illustrated in FIGS. 3A and 3B, the interior display screen 40b displays a video reel image 42a on one portion of the interior display screen. The exterior display screen 40a displays a paytable image 46 and paylines 44. When the exterior display screen 40a and the interior display screen 40b both display their images simultaneously, the player views the overall graphical representation or display through the frontmost display screen 40a, as illustrated in FIG. 3B. In this example, the paylines are actually in front of the reels and the paytable is in a place which is in front of the reels.

Figure 4A:
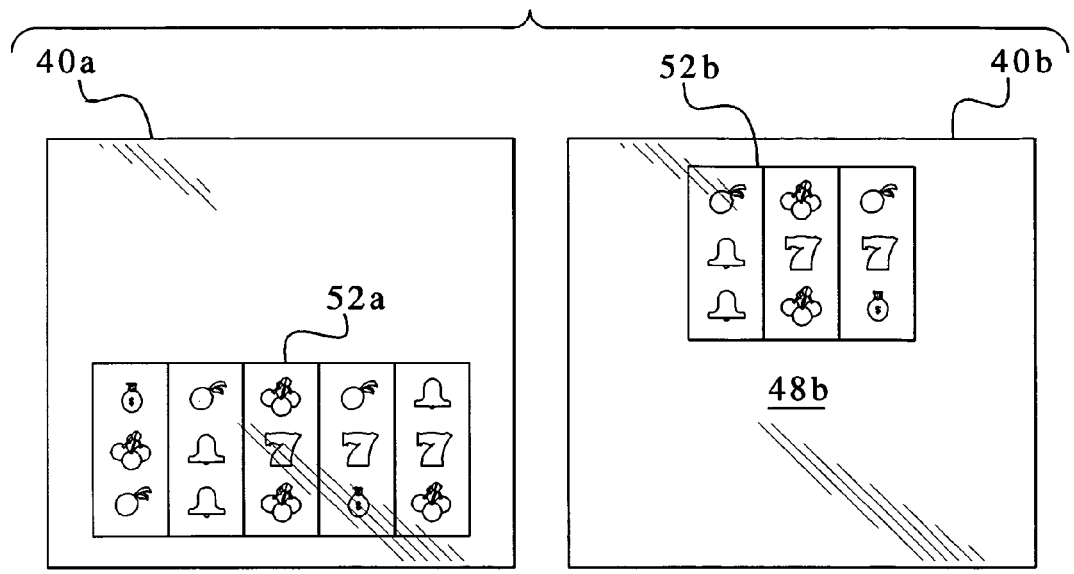
FIG. 4A is an exploded front view of a primary set of reels on the exterior display screen (left side) and a secondary set of reels on the interior display screen (right side) of one embodiment of the present invention.
Figure 4B:
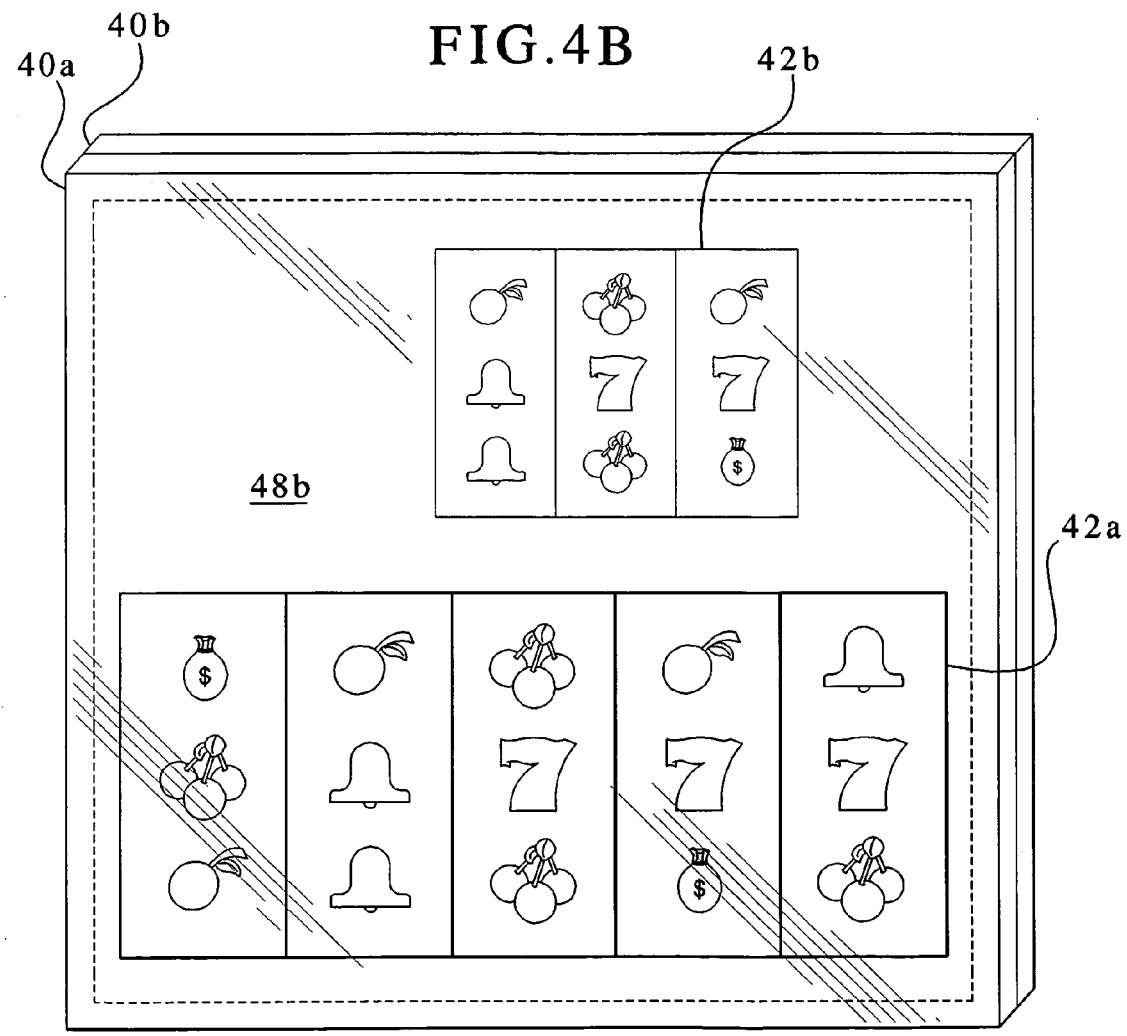
FIG. 4B is a perspective view of the sets of reels of FIG. 4A which a player sees when looking at and through the exterior display screen of FIG. 4A.

In another example illustrated in FIGS. 4A and 4B, the exterior display screen 40a displays a video reel image 52a on one portion of the exterior display screen 40a while the other portions of the exterior display screen are translucent or transparent. The interior display screen 40b displays another video reel image 52b. When the exterior display screen 40a and the interior display screen 40b both display such images simultaneously, the player views the overall graphical representation or display through the exterior display screen 40a, as illustrated in FIG. 4B. The reel image 42a is displayed closer to the player than the reel image 42b.

Figure 5A:
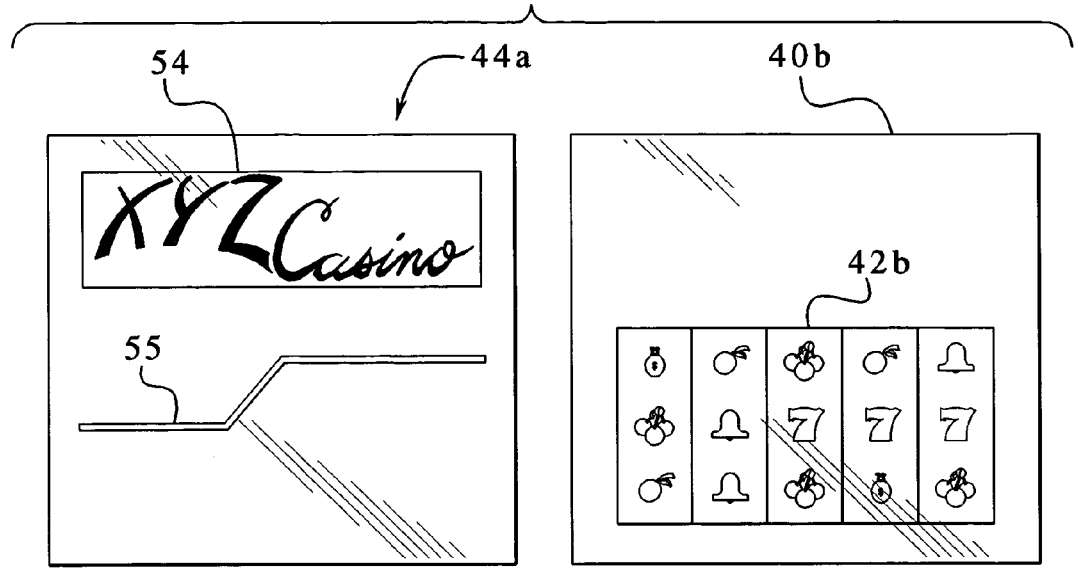
FIG. 5A is a front view of example advertisement and payline on the exterior display screen (left side) and a set of reels on the interior display screen (right side) of one embodiment of the present invention.
Figure 5B:
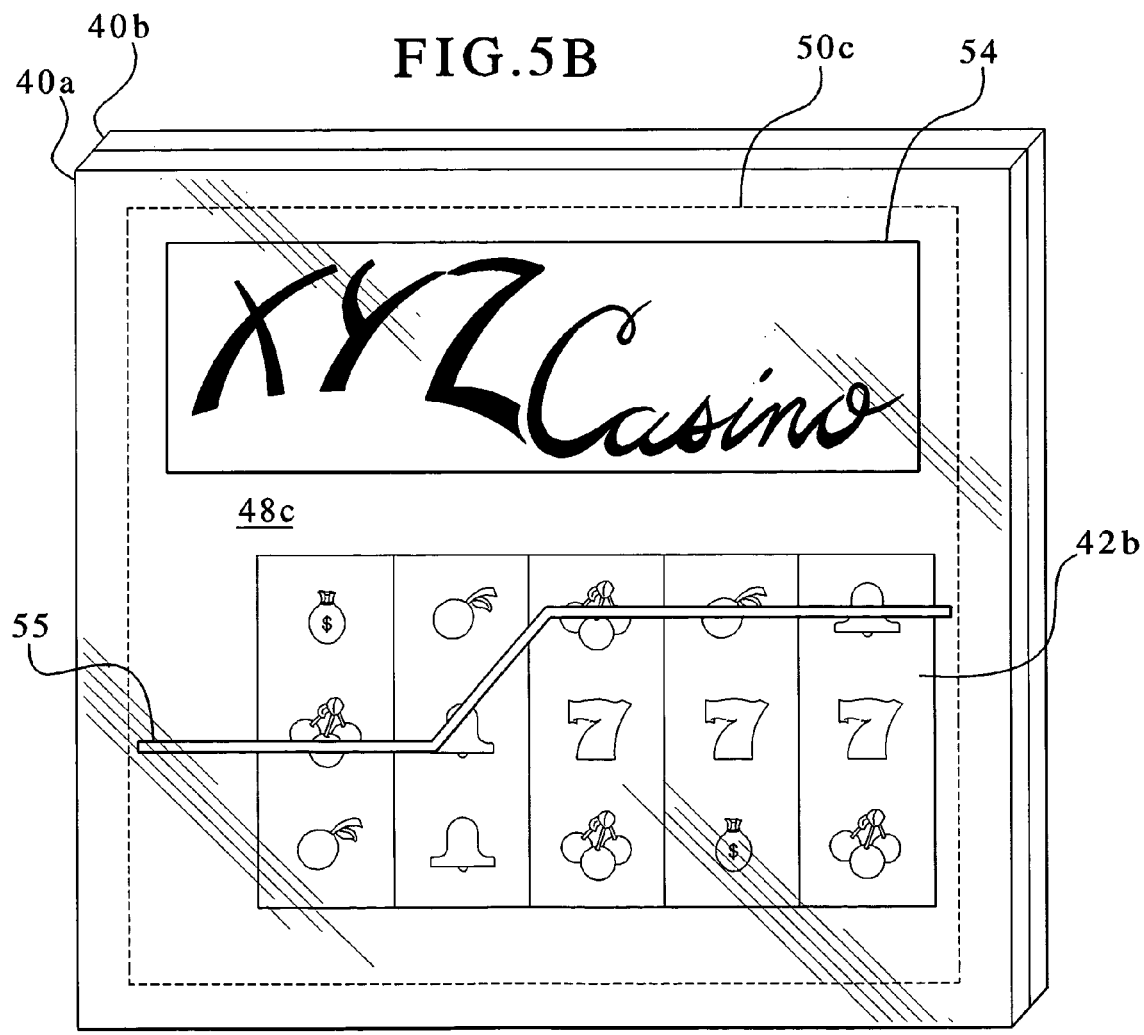
FIG. 5B is a perspective view of the reel, advertisement and payline of FIG. 5A which a player sees when looking at and through the exterior display screen of FIG. 5A.

In another example illustrated in FIGS. 5A and 5B, the interior display screen 40b displays a video reel image 42b on one portion of the interior display screen. The exterior display screen 40a displays an advertisement image 54 and a payline image 55. When the frontmost display screen 40a and the underlying display screen 40b both display such images simultaneously, a player views the overall graphical representation or display through the exterior display screen 40a, as illustrated in FIG. 5B. In this example, the gaming device enables a player to simultaneously view the reel image 42b generated on the interior display screen 40b the payline image 55 generated on the exterior display screen 40a without having to change his or her line of sight.

Figure 6C:
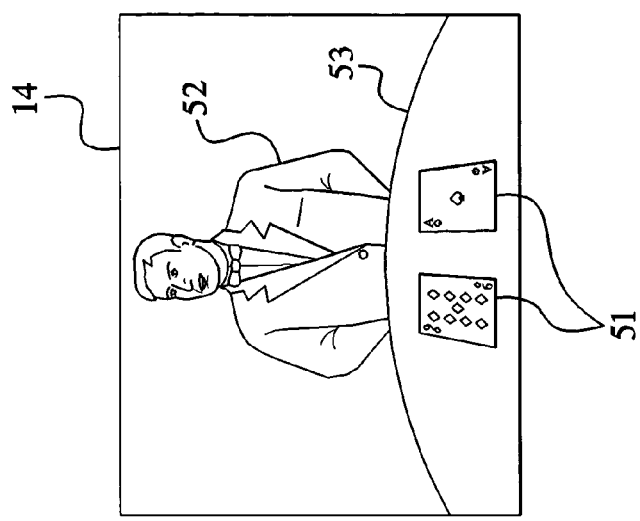
FIG. 6C is a front plan view of the dealer image and the card image displayed on the two display screens of FIGS. 6A and 6B.
Figure 6B:
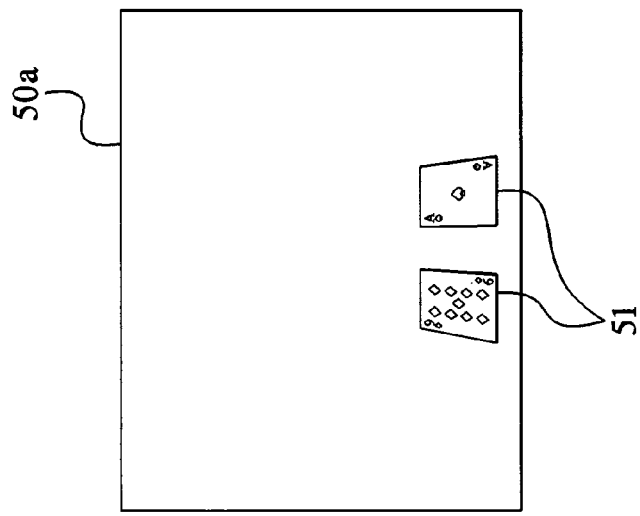
FIG. 6A and FIG. 6B are front plan views of the interior and exterior display screens of one embodiment of the gaming device, wherein the interior display screen displays of an image of a dealer and the exterior display screen displays an image of two cards.
Figure 6A:
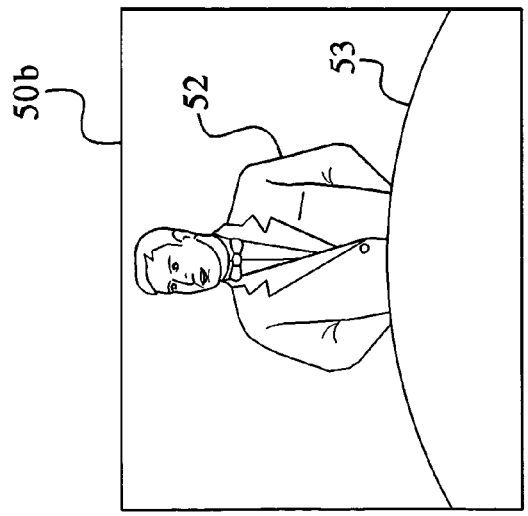

In a further embodiment of the present invention as illustrated in FIGS. 6A, 6B and 6C, the exterior display screen 50a displays a plurality of cards 51 and the interior display screen 50b displays a person such as a dealer 52. The display screen 50b also displays a table 53. It should be appreciated that the background of the dealer image in one embodiment could include an image of a casino. When a player views the display device 14 through the front display screen 50a, the player sees the cards 51 on the table 53 which is in front of the dealer 52. This provides a three-dimensional overall image wherein the cards are closer to the player then the dealer and the table.

Figure 6D:
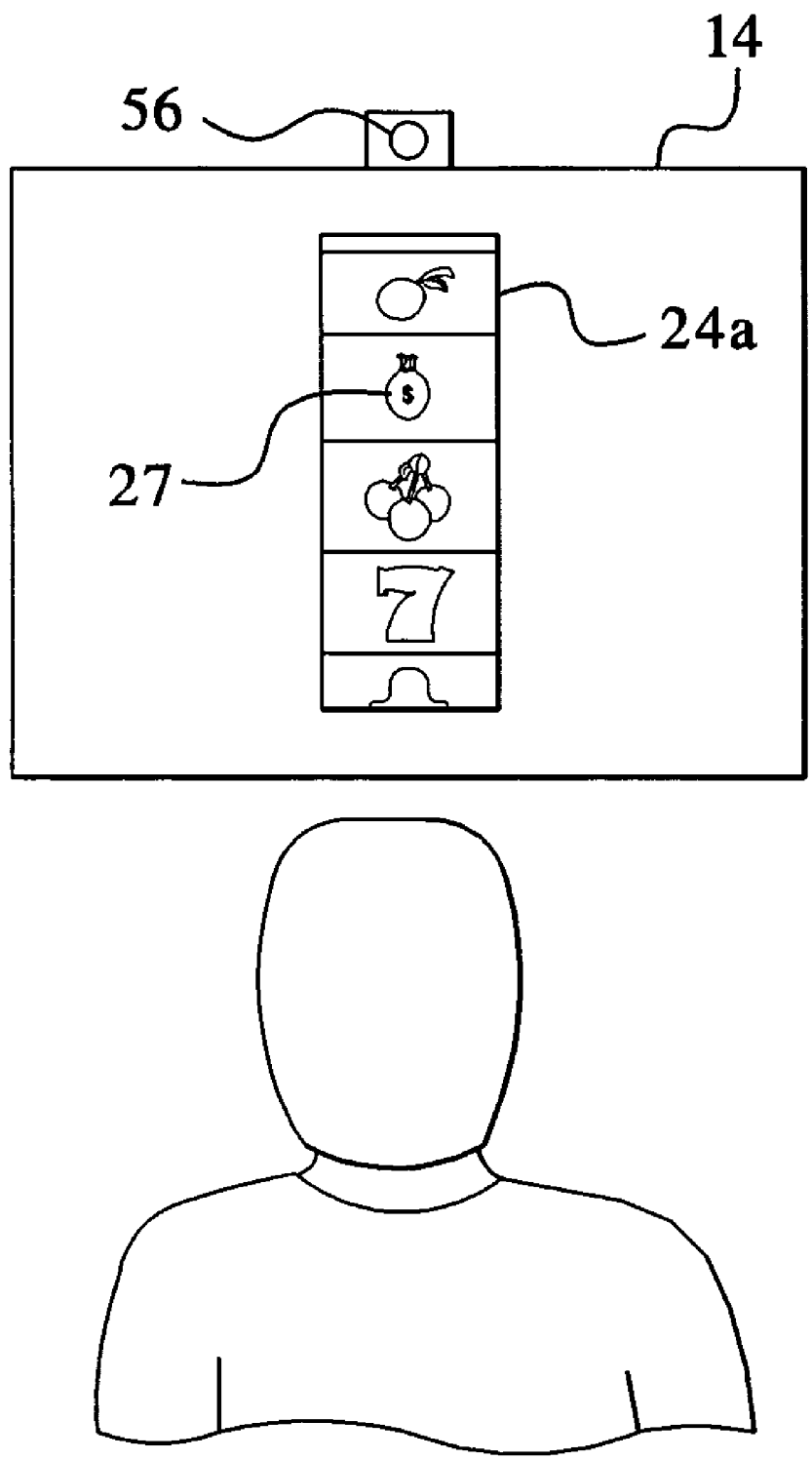
FIG. 6D is a front plan view of a reel displayed on the display screens of the display device of one embodiment of the present invention and a player viewing the reel.
Figure 6E:
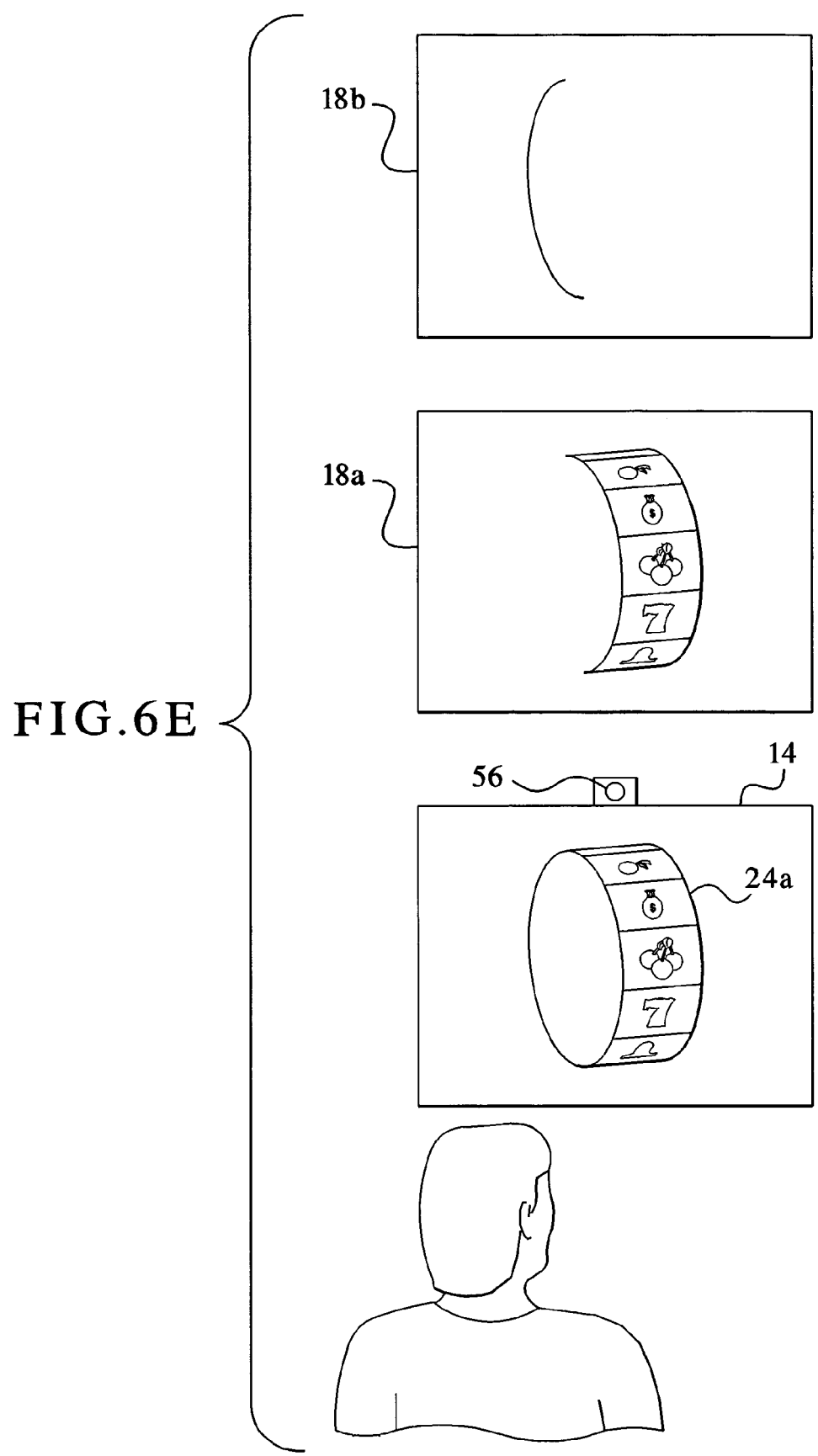
FIG. 6E is an exploded front plan views of the images displayed by an exterior display screen (left side) an intermediate display screen (middle) and an interior display screen (right side) of one embodiment showing the reel of FIG. 6D displayed to the player if the player moves to the player's left.
Figure 6F:
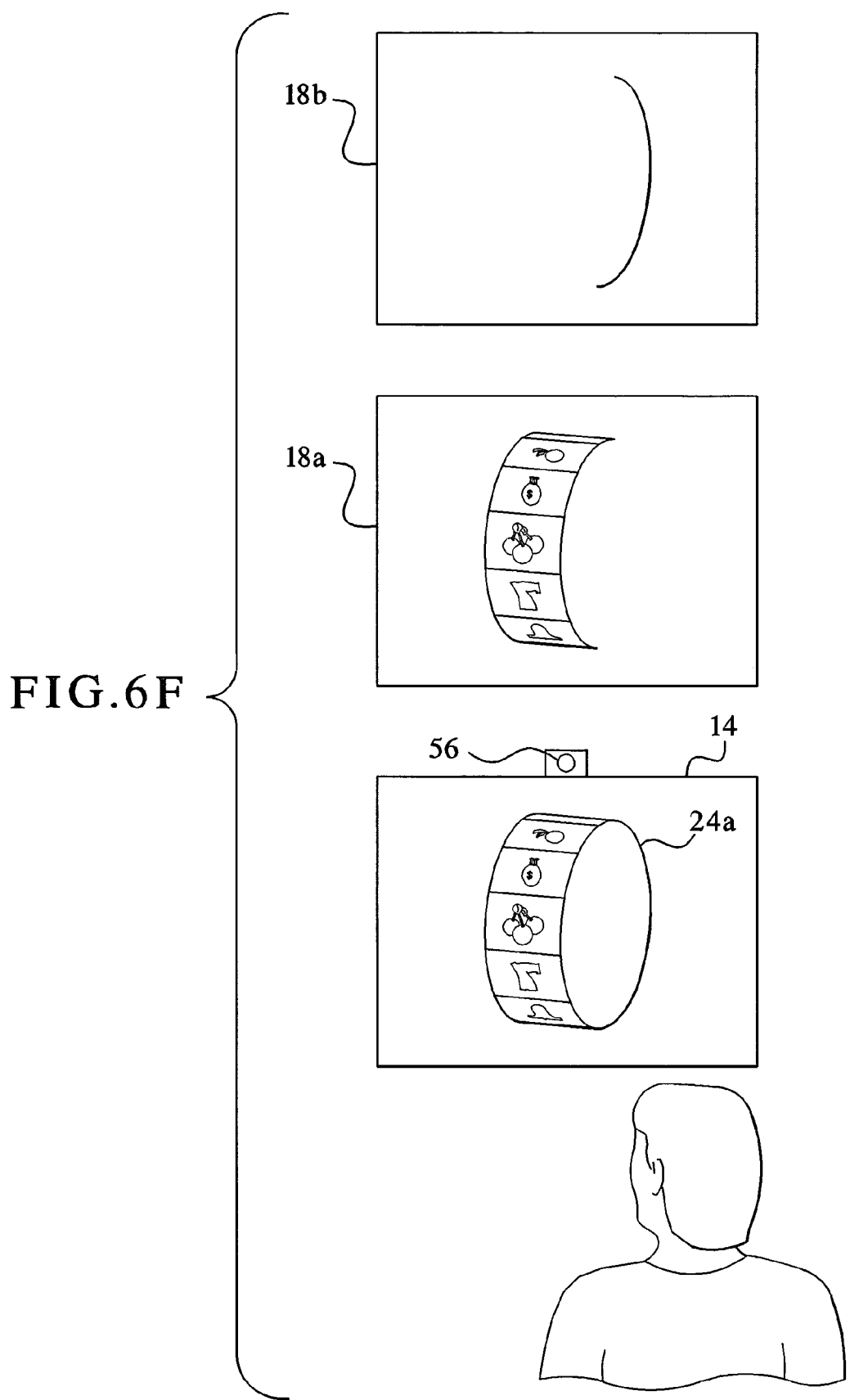
FIG. 6F is an exploded front plan views of the images displayed by an exterior display screen (left side) an intermediate display screen (middle) and an interior display screen (right side) of one embodiment showing the reel of 6D displayed to the player if the player moves to the player's right.

In a further embodiment of the present invention illustrated in FIGS. 6D, 6E and 6F, the gaming device includes a camera or other suitable player sensor 56 which senses the movement of the player and in particular the player's head. In this embodiment of the present invention, when the player is directly in front of the display device 14, the gaming device displays the reel 24a and the symbols 27 on the reel 24a, but not the sides of the reel. Thus, the player sees the front of the reel 24a. As illustrated in FIG. 6E, if the player or player's head moves to the left, the camera or other sensor 56 detects this movement and causes the image of the reel to change such that the player appears to see the left side of the reel 24a. To accomplish this, the exterior display screen 18a displays the front portion of the reel and the interior display screen 18b displays the left rear portion of the reel. If as illustrated in FIG. 6F, the player moves to the right, the camera 56 senses this movement and causes the image of the reel to change such that the player sees the right side of the reel 24a. To accomplish this, the exterior display screen 18a displays the front portion of the reel and the interior display screen 18b displays the right rear portion of the reel. The present invention may thus be adapted to provide three-dimensional images which change based on the player movement to provide a more realistic three-dimensional image to the player.

These examples illustrate the capability of the gaming device of the present invention to enable a player to view different types of information and different types of images by looking at and through the exterior display screen. In certain of the illustrated examples, the images displayed on the different display screens are positioned such that the images do not overlap (that is, the images are not superimposed). In certain other illustrated embodiments the images overlap. It should also be appreciated that the images displayed on the display screen can fade-in fade out or pulsate to create additional affects. In certain embodiments, a player can view different images and different types of information in a single line of sight. It should be appreciated that the present invention specifically contemplates different combinations of different images and co-acting images on the plurality of display screens. The present invention contemplates different game functional images on each display screen or parts of game functional images on the display screens. The following table shows example image combinations of alternative embodiments of the present invention.

| Exterior Display Screen | Interior Display Screen |
|---|---|
| Reels Including Symbols | Reels Including Symbols |
| Reels Inctuding Symbols | Paytable For Symbols |
| Paytable for Symbols | Reels Including Symbols |
| Reels Including Symbols | Information Regarding Primary Game or Other Information Including Textual, Graphic or other Information |
| Primary or Base Game | Secondary or Bonus Game(s) |
| Secondary or Bonus Game | Primary or Base Game |
| Secondary or Bonus Game | Information Regarding Secondary or Bonus Game such as Instructions, Hints and Directions |
| 1$^{st}$ Part of Primary Game | 2$^{nd}$ Part of Primary Game |
| 1$^{st}$ Part of Secondary Game | 2$^{nd}$ Part of Secondary Game |
| Video Cards | Video Cards |
| Image | Image Enhancement |
| First Primary Game | Second Primary Game |
| First Secondary Game | Second Secondary Game |

One embodiment of the gaming device of the present invention, includes a pressure sensitive touch screen 16 such as a conventional touch screen. These touch screens preferably include suitable resistance and capacitance electronics necessary to detect pressure. Electrical connections between the touch screen and the gaming device processor enable the processor to detect a player pressing on an area of the display screen and how hard a player is pushing on a particular area of the display screen. In an alternative embodiment, the display screen include the electronics suitable for detecting and sensing varying degrees of z-axis pressure from a player. Executing one or more programs stored within the memory device, the processor enables a player to activate the exterior display screen by providing a pressure to the touch screen. It should also be appreciated that in alternative embodiments, the player can also activate intermediate or interim display screens by applying higher levels of pressure to the touch screen. This functionality enables a player to reach one or more underlying display screens by providing varying levels of pressure to the touch screen. This type of touch screen is commercially available from EL Touch Systems.

Figure 7A:
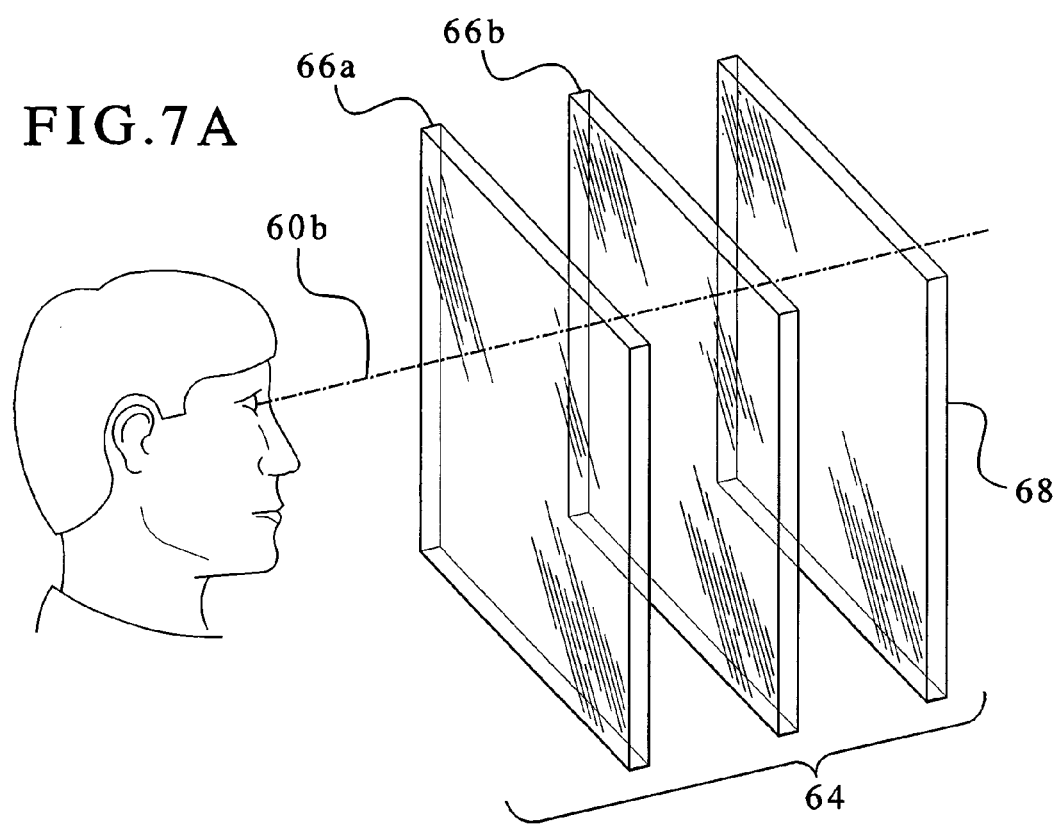
FIG. 7A is an exploded perspective view of an exterior flat display screen, an interior flat display screen and a light source of one embodiment of the present invention.
Figure 7B:
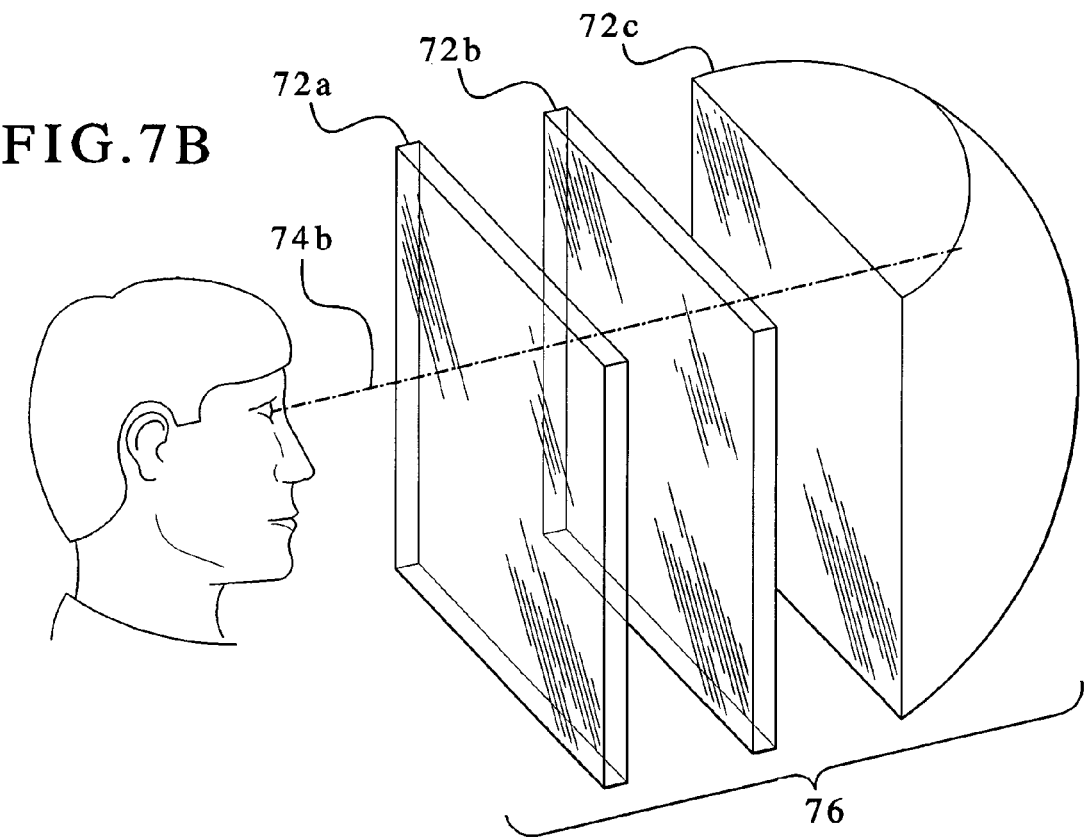
FIG. 7B is a perspective view of an exterior flat display screen, an interior flat display screen, and a cathod ray tube light source of another embodiment of the present invention.

In one embodiment of the present invention, the display device includes a plurality of relatively flat display screens. As illustrated in FIG. 7A, one embodiment of the display device 64 includes two display screens 66a and 66b intersectable by at least one straight line of sight 60b. The exterior and the interior display screen 66a and 66b are or have the capacity to be completely transparent or translucent. This embodiment includes a light source 68. As illustrated in FIG. 7B, display device 76 includes two display screens 72a, 72b and a cathod ray tube 72c which are all intersectable by at least one straight line of sight 74b.

In one embodiment, the display screens are relatively flat and thin, preferably three-sixteenths of an inch (0.476 cms) in thickness. In one embodiment, the relatively flat and thin display screens, having transparent or translucent capacities, are liquid crystal diodes (LCDs). It should be appreciated that the display screen can be any suitable display screens such as lead lanthanum include titanate (PLZT) panel technology or any other suitable technology which involves a matrix of selectively operable light modulating structures, commonly known as pixels or picture elements.

Various companies have developed relatively flat display screens which have the capacity to be transparent or translucent. One such company is Tralas Technologies, Inc., which sells display screens which employ time multiplex optical shutter (TMOS) technology. This TMOS display technology involves: (a) selectively controlled pixels which shutter light out of a light guidance substrate by violating the light guidance conditions of the substrate; and (b) a system for repeatedly causing such violation in a time multiplex fashion. The display screens which embody TMOS technology are inherently transparent and they can be switched to display colors in any pixel area. Certain TMOS display technology is described in U.S. Pat. No. 5,319,491.

Another company, Deep Video Imaging Ltd., produces display screens which have the capability of being translucent or transparent. The display screens sold by Deep Video Imaging Ltd. include 2 (TFT) LCD panels. One product sold by Deep Video Imaging Ltd. is a display device which includes a plurality of TFT LCD panels positioned within the display device. It should be appreciated that the gaming device of the present invention can employ any suitable display material or display screen which has the capacity to be transparent or translucent. For example, such a display screen can include holographic shutters or other suitable technology.

An example of another embodiment of the gaming device where the present invention is employed is illustrated in FIGS. 8A and 8B. Here, gaming device 100 includes a cabinet 12 which houses a display device 14. Display device 14 displays an overall graphical representation or display 104 to a player. Graphical representation or display 104 includes a video reel image 106, an informational or advertisement image 108, a credit display 110 and a bet display 112. The video reel image 106 includes a plurality of video or virtual reels 107. The information image includes information regarding a coming attraction which is a slot tournament on July 8 to 10.

Though it is not apparent by viewing FIG. 8A, the display device 14 includes an exterior display screen and an interior display screen. The exterior display screen displays the video reel image 106, credit display 110 and bet display 112 on its lower portion while all other portions of the exterior display screen are transparent or translucent. The interior display screen displays the advertisement 108 on its upper portion.

Gaming device 100 preferably has the controls, displays and features of a conventional slot or other gaming machine. It is constructed so that a player can operate it while standing or sitting, and gaming device 100 is preferably mounted on a console. However, it should be appreciated that gaming device 100 can be constructed as a pub-style table-top game (not shown) which a player can operate preferably while sitting. Gaming device 100 can incorporate any primary game such as slot, blackjack, poker and keno, any of their bonus triggering events and any of their bonus games. The symbols and indicia used on and in gaming device 100 are in electronic, virtual or video form.

As illustrated in FIG. 8A, gaming device 100 includes a currency acceptor such as a coin slot 114 and bill acceptor 116 where the player inserts money, coins or tokens. The player can place coins in the currency acceptor such as a coin slot 114 or paper money or ticket vouchers in the bill acceptor 116. Other devices could be used for accepting payment such as readers or validators for credit cards or debit cards. When a player inserts money in gaming device 100, a number of credits corresponding to the amount deposited is shown in a credit display 110. After depositing the appropriate amount of money, a player can begin the game by pulling pull arm 118 or pushing play button 120. Play button 120 can be any play activator used by the player which starts any game or sequence of events in the gaming device.

As shown in FIG. 8A, gaming device 100 also includes a bet button 124. The player places a bet by pushing the bet one button 124. The player can increase the bet by one credit each time the player pushes the bet one button 124. When the player pushes the bet one button 124, the number of credits shown in the credit display 110 decreases by one, and the number of credits shown in the bet display 112 increases by one. Although not shown, the gaming device can also include bet max, select line, bet per line and other conventional wager indicators.

A player may cash out between games and thereby receive a number of coins corresponding to the number of remaining credits by pushing a cash out button 126. When the player cashes out, the player receives the coins in a coin payout tray 128. The gaming device 100 may employ other payout mechanisms such as credit slips redeemable by a cashier or electronically recordable cards which keep track of the player's credits. Furthermore, gaming device 100 preferably includes speakers 130 for making sounds or playing music.

As illustrated in FIG. 8B, the general electronic configuration of gaming device 100 preferably includes: a processor 132; a data storage device or memory device 134 for storing computer programs, code or other data; a display device; a sound card 136; a plurality of speakers 130; and one or more input devices 138. The processor 132 is preferably a microprocessor or microcontroller-based platform which is capable of causing the display device 14 of the present invention to display images such as symbols, cards, images of people, characters, places, and objects which function in the gaming device. Data storage or memory device 134 can include any suitable software and/or hardware, including, without limitation, any tape or any disk, such as a CD-ROM, floppy disk, hard disk or any other optical or magnetic disk. The data storage or memory device 134 can include random access memory (RAM) 140 for storing event data or other data generated or used during a particular game. The data storage or memory device 134 can also include read only memory (ROM) 142 for storing program code which controls the gaming device 100 so that it plays a particular game in accordance with applicable game rules and pay tables.

As illustrated further in FIG. 8B, the player preferably uses the input devices 138, such as pull arm 118, play button 120, the bet one button 112 and the cash out button 126 to input signals into gaming device 100. As described above, in certain embodiments one or more of these functions could also be employed on a touch screen. In such embodiments, gaming device 100 includes a touch screen controller 16 which is connected to a video controller 146 and processor 132. A player can make decisions and input signals into the gaming device 100 by touching the appropriate locations on the touch screen display. As further illustrated in FIG. 8B, the processor 132 is connected to currency acceptor such as the coin slot 114 or bill acceptor 116. The processor 132 can be programmed to require a player to deposit a certain amount of money in order to start the game.

It should be appreciated that although a processor 132 and memory device 134 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 132 and memory device 134 preferably reside on each gaming device 100 unit, it is possible to provide some or all of their functions at a central location such as a network server for communication to a playing station such as over a local area network (LAN), wide area network (WAN), Internet connection, microwave link, and the like. The processor 132 and memory device 134 are at times generally referred to herein as the "computer" or "controller."

With reference to FIGS. 8A and 8B, to operate the gaming device 100 in one embodiment the player must insert the appropriate amount of money or tokens at coin slot 114 or bill acceptor 116 and then pull the pull arm 118 or push the play button 120. The video reels 107 will then begin to spin. Eventually, the individual reels 107 will come to a stop. As long as the player has credits remaining, the player can spin the reels 107 again. Depending upon where the reels 107 stop, the player may or may not win additional credits.

In addition to winning credits in this manner, the gaming device 100 may also give players the opportunity to win credits in a bonus round. This type of gaming device 100 will include a program which will automatically begin a bonus round game when the player has achieved a qualifying condition in the game. This qualifying condition can be a particular arrangement of one or more indicia on a display device. As illustrated in the five reel slot game shown in FIG. 8A, the qualifying condition could be the number seven appearing on three adjacent reels 107 along a payline 148. It should be appreciated that the present invention can include one or more paylines, such as payline 148, wherein the paylines can be horizontal, diagonal or any combination thereof.

The gaming device of the present invention can be used to play any type of primary game, bonus round game or other game. In one embodiment, the gaming device includes a game which enables a player to have inputs and interaction which are associated with a depth or z-dimension extending into and through the face of the frontmost display surface. This type of three-dimensional game play can be suitable for wagering games which, by their original design, are three-dimensional, such as blackjack, poker, roulette, and other casino games including, but not limited to, skill and perceived-skill games. Other wagering games can enable a player to cause different events to occur based upon how hard the player pushes on the touch screen. For example, a player could cause reels or objects to move faster by pressing harder on the exterior touch screen. In these types of games, the gaming device can enable the player to interact in the three dimensions by varying the amount of pressure the player applies to the frontmost display screen (which operates as a three-dimensional sensing touch screen, as described earlier).

In another embodiment, the gaming device enables a player to play two or more games on two or more display screens at the same time or at different times. For example, a player can play two related games on two of the display screens simultaneously. In another example, once a player deposits currency to initiate the gaming device, the gaming device may enable the player to chose from one or more games to play on different display screens. In yet another example, the gaming device can include a multi-level bonus scheme which enables a player to advance to different bonus rounds which are displayed and played on different display screens.

As indicated above, the gaming device of the present invention can also enable players to view information and graphics generated on one display screen playing a game which is generated on another display screen. Such information and graphics can include game paytables, game-related information, entertaining graphics, background, history or game theme-related information or information not related to the game, such as advertisements. The gaming device can display this information and graphics adjacent to a game, underneath or behind a game or on top of a game. For example, a gaming device could display a reel game on the frontmost display screen and also display paylines on an underlying display screen, and the paylines could fade in and fade out periodically.

Thus, it should be appreciated that different game function images or parts of images are displayed on the different display screens and can co-act to display one or more three dimensional images to the player.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of at least one processor, said gaming device comprising:
   at least one primary game operable upon a wager by a player, said primary game including a plurality of displayable primary game functional images;
   a housing;
   an at least partially see-through exterior video display supported by the housing and controlled by the at least one processor; and
   an interior video display supported by the housing and controlled by the at least one processor, said interior video display:
      (i) spaced apart from the exterior video display, and
      (ii) aligned with the exterior video display such that a plurality of lines of sight extend through said see-through part of the exterior video display and the interior video display,
   the at least one processor programmed to:
      (a) cause the exterior video display to display at least one of the primary game functional images, and
      (b) simultaneously cause the interior video display to display at least one of the primary game functional images, wherein the at least one primary game functional image displayed by the exterior video display works together with the at least one primary game functional image displayed by the interior video display to display a winning condition, wherein a first part of the winning condition is displayed on the exterior video display and a second part of the winning condition is displayed on the interior video display, and wherein the at least one processor is further programmed to display a sequence of primary game functional images at different locations along an apparent path of motion associated with both the interior video display and the exterior video display wherein a first portion of the sequence of primary game functional images is displayed on the interior video display along a first portion of the apparent path of motion and a second portion of the sequence of primary game functional images is displayed on the exterior video display along a second portion of the apparent path of motion connected to the first portion of the apparent path of motion.

2. The gaming device of claim 1, wherein the plurality of primary game functional images displayed by the exterior video display and the interior video display are different.

3. The gaming device of claim 1, wherein the plurality of primary game functional images displayed by the exterior video display and the interior video display are at least partially the same.

4. The gaming device of claim 1, wherein the plurality of primary game functional images include a plurality of reels.

5. The gaming device of claim 1, wherein the plurality of primary game functional images include a plurality of reels and a plurality of symbols on the reels.

6. The gaming device of claim 1, wherein the entire exterior video display is see-through.

7. The gaming device of claim 1, wherein the exterior video display is selected from the group consisting of: a transparent video display; a translucent video display; a video display having a transparent state; and a video display having a translucent state.

8. The gaming device of claim 1, wherein the at least one of the primary game functional images displayed by the exterior video display provides a first part of the primary game, and wherein the at least one of the primary game functional images displayed by the interior video display provides a second part of the primary game.

9. The gaming device of claim 1, wherein the primary game functional images include a plurality of symbols, and the processor is programmed to cause the exterior video display to display a plurality of the symbols in a play of the primary game and to cause the interior video display to display a plurality of the symbols in said play of the primary game.

10. The gaming device of claim 1, wherein the winning condition is a qualifying condition.

11. A gaming device operable under control of at least one processor, said gaming device comprising:
    at least one primary game operable upon a wager by a player, said primary game including a plurality of displayable primary game functional images;
    at least one secondary game operable after an occurrence of a triggering event, said secondary game including a plurality of displayable secondary game functional images;
    a housing;
    an at least partially see-through exterior video display supported by the housing and controlled by the at least one processor; and
    an interior video display supported by the housing and controlled by the at least one processor, said interior video display:
       (i) spaced apart from the exterior video display, and
       (ii) aligned with the exterior video display such that a plurality of lines of sight extend through said see-through part of the exterior video display and the interior video display,
    the at least one processor programmed to after an occurrence of the triggering event:
       (a) cause the exterior video display to display at least one of the secondary game functional images, and
       (b) simultaneously cause the interior video display to display at least one of the secondary game functional images, wherein the at least one secondary game functional image displayed by the exterior video display works together with the at least one secondary game functional image displayed by the interior video display to display a winning condition, wherein a first part of the winning condition is displayed on the exterior video display and a second part of the winning condition is displayed on the interior video display screen, and wherein the at least one processor is further programmed to display a sequence of secondary game functional images at different locations along an apparent path of motion associated with both the interior video display and the exterior video display wherein a first portion of the sequence of secondary game functional images is displayed on the interior video display along a first portion of the apparent path of motion and a second portion of the sequence of secondary game functional images is displayed on the exterior video display along a second portion of the apparent path of motion connected to the first portion of the apparent path of motion.

12. The gaming device of claim 11, wherein the triggering event can occur in the primary game.

13. The gaming device of claim 11, wherein the plurality of secondary game functional images displayed by the exterior video display and the interior video display are different.

14. The gaming device of claim 11, wherein the plurality of secondary game functional images displayed by the exterior video display and the interior video display are at least partially the same.

15. The gaming device of claim 11, wherein the plurality of secondary game functional images include a plurality of reels.

16. The gaming device of claim 11, wherein the plurality of secondary game functional images include a plurality of reels and a plurality of symbols on the reels.

17. The gaming device of claim 11, wherein the entire exterior video display is see-through.

18. The gaming device of claim 11, wherein the exterior video display is selected from the group consisting of: a transparent video display; a translucent video display; a video display having a transparent state; and a video display having a translucent state.

19. The gaming device of claim 11, wherein the at least one of the secondary game functional images displayed by the exterior video display provides a first part of the secondary game, and wherein the at least one of the secondary game functional images displayed by the interior video display provides a second part of the secondary game.

20. The gaming device of claim 11, wherein the secondary game functional images include a plurality of symbols, and the processor is programmed to cause the exterior video display to display a plurality of the symbol in a play of the secondary game, and to cause the interior video display to display a plurality of the symbols in said play of the secondary game.

21. The gaming device of claim 11, wherein the winning condition is a qualifying condition.

22. A gaming device operable under control of at least one processor, said gaming device comprising:
at least one primary game operable upon a wager by a player, said primary game including a plurality of displayable primary game functional images;
at least one secondary game operable after a triggering event, said secondary game including a plurality of displayable secondary game functional images;
a housing;
an at least partially see-through exterior video display supported by the housing and controlled by the at least one processor; and
an interior video display supported by the housing and controlled by the at least one processor, said interior video display:
(i) spaced apart from the exterior video display, and
(ii) aligned with the exterior video display such that a plurality of lines of sight extend through said see-through part of the exterior video display and the interior video display,
the at least one processor programmed to:
(a) cause the exterior video display to display at least one of the primary game functional images, and
(b) after an occurrence of the triggering event, cause the interior video display to display at least one of the secondary game functional images, wherein the at least one of the primary game functional images displayed by the exterior video display and the at least one of the secondary game functional images displayed by the interior video display at least one winning condition, wherein a first part of the at least one winning condition is displayed on the exterior video display and a second part of the at least one winning condition is displayed on the interior video display, and wherein the at least one processor is further programmed to display a sequence of game functional images at different locations along an apparent path of motion associated with both the interior video display and the exterior video display wherein a first portion of the sequence of game functional images is displayed only on the interior video display along a first portion of the apparent path of motion and a second portion of the sequence of game functional images is displayed only on the exterior video display along a second portion of the apparent path of motion connected to the first portion of the apparent path of motion.

23. The gaming device of claim 22, wherein the triggering event can occur in the primary game.

24. The gaming device of claim 22, wherein the plurality of functional images displayed by the exterior video display and the interior video display are different.

25. The gaming device of claim 22, wherein the plurality of functional images displayed by the exterior video display and the interior video display are at least partially the same.

26. The gaming device of claim 22, wherein the plurality of functional images include a plurality of reels.

27. The gaming device of claim 22, wherein the plurality of functional images include a plurality of reels and a plurality of symbols on the reels.

28. The gaming device of claim 22, wherein the entire exterior video display is see-through.

29. The gaming device of claim 22, wherein the exterior video display is selected from the group consisting of: a transparent video display; a translucent video display; a video display having a transparent state; and a video display having a translucent state.

30. The gaming device of claim 22, wherein the winning condition is a qualifying condition.

31. A gaming device operable under control of at least one processor, said gaming device comprising:
at least one primary game operable upon a wager by a player, said primary game including a plurality of displayable primary game functional images;
at least one secondary game operable after a triggering event, said secondary game including a plurality of displayable secondary game functional images;
a housing;
an at least partially see-through exterior video display controlled by the at least one processor; and
an interior video display controlled by the at least one processor, said interior video display:

(i) spaced apart from the exterior video display, and
(ii) aligned with the exterior video display such that a plurality of lines of sight extend through said see-through part of the exterior video display and the interior video display,
the at least one processor programmed to:
(a) cause the interior video display to display at least one of the primary game functional images, and
(b) after an occurrence of the triggering event, cause the exterior video display to display at least one of the secondary game functional images, wherein the at least one of the primary game functional images displayed by the interior video display and the at least one of the secondary game functional images displayed by the exterior video screen display one winning condition, wherein a first part of the at least one winning condition is displayed on the exterior video display and a second part of the at least one winning condition is displayed on the interior video display, and wherein the at least one processor is further programmed to display a sequence of game functional images at different locations along an apparent path of motion associated with both the interior video display and the exterior video display wherein a first portion of the sequence of game functional images is displayed only on the interior video display along a first portion of the apparent path of motion and a second portion of the sequence of game functional images is displayed only on the exterior video display along a second portion of the apparent path of motion connected to the first portion of the apparent path of motion.

32. The gaming device of claim 31, wherein the triggering event can occur in the primary game.

33. The gaming device of claim 31, wherein the plurality of functional images displayed by the exterior video display and the interior video display are different.

34. The gaming device of claim 31, wherein the plurality of functional images displayed by the exterior video display and the interior video display are at least partially the same.

35. The gaming device of claim 31, wherein the plurality of functional images include a plurality of reels.

36. The gaming device of claim 31, wherein the plurality of functional images include a plurality of reels and a plurality of reels and a plurality of symbols on the reels.

37. The gaming device of claim 31, wherein the entire exterior video display is see-through.

38. The gaming device of claim 31, wherein the exterior video display is selected from the group consisting of: a transparent video display; a translucent video display; a video display having a transparent state; and a video display having a translucent state.

39. The gaming device of claim 31, wherein the winning condition is a qualifying condition.

40. A gaming device operable under control of at least one processor, said gaming device comprising:
at least one primary game operable upon a wager by a player, said primary game including a plurality of displayable primary game functional images;
a housing;
an at least partially see-through exterior video display supported by the housing and controlled by the at least one processor; and
an interior video display supported by the housing and controlled by the at least one processor, said interior video display:

(i) spaced apart from the exterior video display, and
(ii) aligned with the exterior video display such that a plurality of lines of sight extend through said see-through part of the exterior video display and the interior video display,
the at least one processor programmed to cause;
(a) one of the exterior video display and interior video display to display at least one of the primary game functional images, and
(b) the other of the exterior video display and interior video display to simultaneously display information regarding the primary game or primary game functional images, wherein the at least one of the primary game functional images displayed by one of the exterior and interior video display works together with the simultaneously displayed information regarding the primary game or primary game functional images to display a winning condition, and wherein the at least one processor is further programmed to display a sequence of game functional images at different locations along an apparent path of motion associated with both the interior video display and the exterior video display wherein a first portion of the sequence of game functional images is displayed on the interior video display along a first portion of the apparent path of motion and a second portion of the sequence of game functional images is displayed on the exterior video display along a second portion of the apparent path of motion connected to the first portion of the apparent path of motion.

41. The gaming device of claim 40, wherein the information includes a paytable for the primary game.

42. The gaming device of claim 40, wherein the plurality of primary game functional images include a plurality of reels.

43. The gaming device of claim 42, wherein the information includes a paytable for the reels.

44. The gaming device of claim 40, wherein the plurality of primary game functional images include a plurality of reels and a plurality of symbols on the reels.

45. The gaming device of claim 44, wherein the information includes a paytable for the symbols.

46. The gaming device of claim 40, wherein the entire exterior video display is see-through.

47. The gaming device of claim 40, wherein the exterior video display is selected from the group consisting of: a transparent video display; a translucent video display; a video display having a transparent state; and a video display having a translucent state.

48. The gaming device of claim 40, wherein the winning condition is a qualifying condition.

49. A gaming device operable under control of at least one processor, said gaming device comprising:
a game controlled by the at least one processor and operable upon a wager;
a first display device controlled by the at least one processor, said first display device operable to display at least a portion of the game;
wherein said processor is configured to control a play of the game by:
(i) determining if an event occurs in the play of the game, and
(ii) if the event occurs in the play of the game:
(a) causing the first display device to change at least a portion of the first display device from a non-transparent state to a transparent state, wherein said changed portion of the first display device is operable to generate a display of at least a portion of the game while in the non-transparent state, and wherein the transparent state of said first portion of the first display allows a second display device to be viewed through a plurality of lines of sight extending through the first display device, and (b) causing said second display device to generate a display of at least a portion of the game, wherein the portion of the game displayed by the second display and a portion of the game displayed by the first display in the transparent state work together to display at least one winning condition wherein the at least one processor is further programmed to display a sequence of game functional images at different locations along an apparent path of motion associated with both the interior video first display device and the second display device wherein a first portion of the sequence of game functional images is displayed only on the second display device along a first portion of the apparent path of motion and a second portion of the sequence of game functional images is displayed only on the first display device along a second portion of the apparent path of motion connected to the first portion of the apparent path of motion.

* * * * *